United States Patent
Rabaut et al.

(10) Patent No.: US 12,523,197 B2
(45) Date of Patent: Jan. 13, 2026

(54) DEVICE AND METHOD FOR OFFSHORE ARRANGING OF A WIND TURBINE OR COMPONENTS THEREOF

(71) Applicant: DEME Offshore BE NV, Zwijndrecht (BE)

(72) Inventors: Dieter Wim Jan Rabaut, Ghent (BE); Jan Maria Koen Michielsen, Antwerp (BE)

(73) Assignee: DEME Offshore BE NV, Zwijndrecht (BE)

( * ) Notice: Subject to any disclaimer, the term of this patent is extended or adjusted under 35 U.S.C. 154(b) by 174 days.

(21) Appl. No.: 18/291,994

(22) PCT Filed: Jul. 26, 2022

(86) PCT No.: PCT/EP2022/070884
§ 371 (c)(1),
(2) Date: Jan. 25, 2024

(87) PCT Pub. No.: WO2023/006711
PCT Pub. Date: Feb. 2, 2023

(65) Prior Publication Data
US 2024/0376862 A1  Nov. 14, 2024

(30) Foreign Application Priority Data
Jul. 29, 2021  (BE) .................................. 2021/5601

(51) Int. Cl.
*F03D 13/10* (2016.01)
*B63B 75/00* (2020.01)
(Continued)

(52) U.S. Cl.
CPC ............ *F03D 13/112* (2023.08); *B63B 75/00* (2020.01); *E02B 17/00* (2013.01); *E04H 12/344* (2013.01);
(Continued)

(58) Field of Classification Search
CPC ........ F03D 13/112; F03D 13/25; F03D 13/10; F03D 13/40; F03D 13/139; B63B 75/00;
(Continued)

(56) References Cited

U.S. PATENT DOCUMENTS 8,316,614 B2 * 11/2012 Soe-Jensen ............... B66C 1/62
416/142
8,701,579 B2 * 4/2014 Roodenburg ........... B63B 1/107
405/209

(Continued)

FOREIGN PATENT DOCUMENTS

KR  1020170107628 A  9/2017

*Primary Examiner* — Carib A Oquendo
(74) *Attorney, Agent, or Firm* — The Webb Law Firm

(57) ABSTRACT

Described is a device for offshore arranging of a wind turbine or components thereof on a foundation present at sea. The device includes an elongate superstructure connected releasably to the foundation and extending between a lower surface and an upper surface thereof in the vertical direction from the foundation. The superstructure has an internal space which is accessible to a tower section of the wind turbine and in which the tower section can be received. Further present is a horizontally displaceable supply structure for a tower section. The supply structure is configured to move a tower section coupled thereto from outside the internal space into the internal space by a horizontal displacement. An engaging structure, received for vertical displacement in the internal space, is configured to lift an engaged tower section in the internal space by a vertical displacement, whereby sufficient space is created under the relevant tower section for receiving another, underlying tower section in the internal space.

13 Claims, 23 Drawing Sheets

(51) Int. Cl.
  *E02B 17/00* (2006.01)
  *E04H 12/34* (2006.01)
  *F03D 13/25* (2016.01)
  *B66C 23/18* (2006.01)
  *B66C 23/52* (2006.01)

(52) U.S. Cl.
  CPC ............ *F03D 13/25* (2016.05); *B66C 23/185* (2013.01); *B66C 23/52* (2013.01); *E02B 2017/0043* (2013.01); *E02B 2017/0091* (2013.01); *F05B 2230/6102* (2013.01)

(58) Field of Classification Search
  CPC ........... B63B 35/003; E02B 2017/0091; E02B 2017/0043; Y02E 10/727; E04H 12/344; F05B 2230/6102
  See application file for complete search history.

(56) References Cited

U.S. PATENT DOCUMENTS

| | | | |
|---|---|---|---|
| 2005/0286979 A1* | 12/2005 | Watchorn | E02B 17/00 405/203 |
| 2010/0316450 A1* | 12/2010 | Botwright | B63B 77/10 405/209 |
| 2017/0275845 A1* | 9/2017 | Belder | E02D 7/06 |
| 2022/0260057 A1* | 8/2022 | Falkenberg | F03D 13/25 |
| 2023/0392584 A1* | 12/2023 | Wijning | F03D 13/25 |
| 2024/0301869 A1* | 9/2024 | Wijning | B63B 77/10 |
| 2025/0154932 A1* | 5/2025 | Kjersem | B66C 23/18 |

\* cited by examiner

DEVICE AND METHOD FOR OFFSHORE ARRANGING OF A WIND TURBINE OR COMPONENTS THEREOF

CROSS REFERENCE TO RELATED APPLICATIONS

This application is the United States national phase of International Patent Application No. PCT/EP2022/070884 filed Jul. 26, 2022, and claims priority to Belgian Patent Application No. 2021/5601 filed Jul. 29, 2021, the disclosures of which are hereby incorporated by reference in their entireties.

BACKGROUND OF THE INVENTION

Field of the Invention

The invention relates to a device for offshore arranging of a wind turbine or components thereof on a vertically extending foundation present at sea. The invention likewise relates to a method for arranging the wind turbine or the components thereof on the foundation with the device.

Description of Related Art

Offshore wind energy is being used on increasingly larger scale, and recent years have seen a great increase in the number of wind farms placed at sea. These wind farms of mutually electrically coupled wind turbines are generally located on the continental shelf in the sea, although there is a noticeable trend of placing such wind farms further out at sea as well. What's more, not only is the number of wind turbines placed offshore increasing, their size is also constantly increasing in an effort to increase their production capacity.

The above stated factors entail new challenges in respect of the actual placing of these offshore wind turbines on a foundation already present at sea. The foundation extends here in vertical direction and serves to bridge the distance between the seabed and the wind turbine protruding above water. For offshore wind turbines which are placed in relatively shallow water the foundation can comprise a monopile which is arranged in the seabed and extends to a position above the water surface. A lattice structure or jacket can, if desired, be applied for deeper water. A floating foundation can, if desired, be applied for even deeper water. Such a floating foundation consist of a floating body situated at or below the waterline and anchored to the seabed, for instance by means of cables. It is also possible to make use of a transition piece between the wind turbine mast and the foundation. If desired, the transition piece can be provided with superstructures such as a work platform, a jetty and other useful applications.

A frequently used method consists of manufacturing or assembling the wind turbine to the most integrated state possible on land and then transporting it to the foundation at sea on which the wind turbine is to be arranged. Installation vessels configured for this specific task are applied to be able to carry out this transport. These are however becoming increasingly bigger and are being provided with increasingly heavier lifting cranes to be able to take up the wind turbine and place it on the foundation. Jack-up installation vessels can be applied for a more stable installation at sea. Such jack-up vessels can lift themselves out of the sea on legs, making them less susceptible to the effect of waves and wind. Because installation vessels are designed specifically for transport and placing of substantially complete wind turbines, flexibility is lost.

KR 2017 0107628 A describes a device for offshore mounting of a wind turbine on a foundation present at sea. The described device makes it possible to perform the complete assembly of a wind turbine on the deck of a lifting platform. The completely assembled wind turbine is then placed on the foundation with a lifting crane. For assembly on the lifting platform the device comprises an upper gripping means configured to lift a coupled tower section by means of a vertical movement, and a horizontally displaceable supply structure for another tower section.

It has also been proposed to transport the wind turbine components to the foundation separately and then place these components on the foundation in a determined order. This method can facilitate the transport, but has the drawback that the placing of each component at sea takes up a great deal of time. A wind turbine does indeed generally comprise a number of tower sections, mutually stacked tower sections of which together form a wind turbine mast, a hub to be placed on the mast, and a number of wind turbine blades which are arranged in the hub. Because the number of components to be placed is greater than when a wind turbine is placed as a whole, the risk of unsafe situations increases further.

SUMMARY OF THE INVENTION

The invention has for its object, among others, to provide a device and corresponding method which at least partially prevent the above stated prior art drawbacks.

According to the invention, this object is achieved by providing a device as described herein. The device for offshore construction of a wind turbine or arranging of components thereof on a vertically extending foundation present at sea comprises:
  an elongate superstructure connected releasably to the foundation and extending between a lower surface and an upper surface thereof in the vertical direction from the foundation, wherein the superstructure comprises an internal space which is accessible to a tower section of the wind turbine and in which the tower section can be received;
  a horizontally displaceable supply structure for a tower section, wherein the supply structure is configured to move a tower section coupled thereto from outside the internal space into the internal space by a horizontal displacement.
  an engaging structure, received for vertical displacement in the internal space, for a tower section received in the internal space, wherein the engaging structure is configured to lift an engaged tower section in the internal space by a vertical displacement, whereby sufficient space is created under the relevant tower section for receiving another, underlying tower section in the internal space.

In another aspect of the invention an assembly of the device and a vessel is provided. The assembly is suitable for offshore construction of a wind turbine or for arranging components thereof on a vertically extending foundation present at sea, and comprises a vessel which is provided with the wind turbine components to be arranged, these comprising a hub, one or more blades and/or one or more tower sections for forming a tower of the wind turbine, and further with a lifting means for taking up the wind turbine components; and a device according to an embodiment of the invention.

In yet another aspect of the invention a method is provided for offshore construction of a wind turbine or for arranging of components thereof on a vertically extending foundation present at sea. The method comprises the steps of providing an assembly according to an embodiment of the invention; taking up a tower section with the lifting means and coupling it to the supply structure; moving the tower section coupled to the supply structure from outside the internal space into the internal space by displacing the supply structure and the tower section coupled thereto in horizontal direction; engaging the tower section, which was moved into the internal space, with the engaging structure; and lifting the engaged tower section in the internal space by vertically displacing the engaging structure, whereby sufficient space is created under the relevant tower section for receiving another, underlying tower section in the internal space.

DETAILED DESCRIPTION OF THE INVENTION

According to the invention, the superstructure connected releasably to the foundation comprises an internal space which is accessible to a tower section of the wind turbine and in which the tower section, and optionally a plurality of tower sections, can be received. The internal space can extend substantially wholly between the lower surface and the upper surface of the superstructure. With the engaging structure received for vertical displacement in the internal space an engaged tower section can be moved in the internal space by a vertical displacement, this in controlled manner and relatively independently of wave movements. The superstructure does indeed form a substantially stable whole. An upward directed vertical displacement of an engaged tower section creates space for an underlying tower section to be received in the internal space. Such a tower section can be introduced into the internal space by coupling it to the horizontally displaceable supply structure outside the internal space and then displacing the supply structure horizontally from the position outside the internal space to a position inside the internal space.

With the invented device components of a wind turbine can be arranged on the foundation in accurate and safe manner and in a desired order, whereby a wind turbine can be constructed. The invention is particularly suitable for constructing a new wind turbine, but can also be used to replace a wind turbine component, particularly a tower section, which is worn or requires replacement for other reasons.

The superstructure connected releasably to the foundation provides for an increased stability during handling of wind turbine components. The superstructure further allows the construction of a desired complete wind turbine, wherein the effect of waves and wind on the structure is significantly reduced. Larger wind turbines can hereby be placed at sea under rougher conditions than was heretofore possible according to the prior art.

An embodiment of the invention is aimed at a device wherein the engaging structure is configured to lower an engaged tower section in the internal space to a position against an underlying tower section in order to couple the relevant tower section to the underlying tower section. The coupling can take place in known manner, for instance by mutually connecting corresponding flanges of the tower sections, for instance by means of a bolt connection. Other ways of connecting are however not precluded.

A suitable embodiment according to the invention provides a device wherein the engaging structure is configured to lift an engaged tower section in the internal space to a position in which the tower section protrudes above the upper surface of the superstructure. In this embodiment it becomes possible to provide a tower section thus protruding above the upper surface of the superstructure on an upper side thereof with a hub, in which wind turbine blades can then be arranged.

Another embodiment of the device is characterized in that the engaging structure is displaceable between securing positions. In these securing positions the engaging structure can be connected and fixed to the surrounding superstructure. Forces acting on the engaging structure (for instance in that a tower section is engaged by the engaging structure) are hereby transmitted to the superstructure and from there on to the foundation. The securing positions can be situated at any height of the superstructure. They can also be distributed randomly or conversely regularly over the height of the superstructure. The manner of securing can be embodied in known manner, for instance by a pin-hole connection, preferably a hydraulically driven pin-hole connection.

The displacing means for displacing the engaging structure in vertical direction can also be embodied in known manner. It is thus possible to embody the displacing means as a set of cables which is attached on an upper side of the engaging structure and is carried to winches for being taken in or payed out, which winches are for instance secured at the height of the upper surface of the superstructure. In another embodiment the displacing means comprise a rack and pinion (or toothed wheel) system, wherein a rack extends in vertical direction along an upright of the superstructure and the toothed wheel is connected to the engaging structure, for instance a toothed wheel in each corner of an engaging structure with polygonal section. It will be apparent that the invention is not limited to the stated examples and that other known embodiments of the displacing means are likewise possible.

According to another embodiment of the device, the supply structure is arranged at the position of the lower surface of the superstructure. A tower section is then displaced on an underside of the superstructure into the internal space thereof. This has the advantage that a wind turbine tower or mast can be constructed from the bottom up, wherein an upper tower section can already be provided with a hub with, if desired, a number of blades. The arranging of the hub and optionally the blades can here be carried out in controlled manner at the position of the upper surface of the superstructure.

According to yet another embodiment of the device, it is characterized in that the supply structure protrudes on either side of the superstructure in the horizontal direction. This enables a tower section to be coupled to the supply structure from the outside, in any case along a supply side of the protruding parts of the supply structure. A discharge side of the protruding parts of the supply structure, lying opposite the supply side, can for instance be used to discharge the superstructure after the construction or other work has been completed. This will be further elucidated below.

According to yet another suitable embodiment of the device, the supply structure comprises a support surface for a floor which is slidable in the horizontal direction between positions inside and outside the internal space and to which a tower section can be coupled. The support surface preferably protrudes from the superstructure on either side, making it possible to slide the floor from an outer position on the supply side to an inner position in the internal space, and on to an outer position on the discharge side of the protruding parts of the supply structure. The slidable floor can here thus be slid between three operative positions over the support surface. This latter can for instance be formed by a beam frame extending in a horizontal plane and, if desired, provided with rails over which the floor can slide or run.

In order to facilitate the arranging of a hub, and particularly of a number of blades in the hub, in an embodiment of the invention the superstructure comprises at the position of the upper surface a positioning means for a root of a wind turbine blade, wherein the positioning means is movable in the horizontal and vertical direction. The positioning means can for instance be connected to the upper surface of the superstructure via a static part. A dynamic part connected movably to the static part is movable in a horizontal plane (X, Y) and likewise in a vertical plane Z. This moveability can be embodied in known manner, for instance using hydraulic or pneumatic cylinders running between the static and dynamic part. The cylinders are preferably controlled by a hydraulic circuit in which they are received, preferably under the control of a controller. The dynamic part can be provided with a receiving surface, the geometry of which is adapted to that of the blade root to be received therein. The receiving surface can thus be a part-cylindrical receiving surface for a blade root with substantially cylindrical cross-section. If desired, the receiving surface can comprise a plurality of parts which can take up mutually differing positions, for instance to be able to move the receiving surface from an opened to a closed position.

According to the invention, the internal space of the superstructure must be accessible to a tower section or preferably to a plurality of stacked tower sections. In an embodiment this is achieved by an at least partially open side wall of the superstructure. The open side wall can extend over a part of the height of the superstructure or over substantially the whole height of the superstructure. In an embodiment the open side wall can be closed by a closing structure, such as a door.

The height of the superstructure extends from the lower surface to the upper surface of the superstructure and must in any case be at least as high as one tower section, preferably at least as high as two connected tower sections placed one on the other, still more preferably at least as high as three connected tower sections placed one on the other. The height of the superstructure is further preferably at least equal to the length of a turbine blade. A turbine blade mounted on the hub, wherein the hub is situated at the position of the upper surface of the superstructure, should preferably not come into contact with the water surface when this wind turbine blade is installed, for instance with the positioning means.

The lower surface of the superstructure is here connected to the foundation in per se known manner. The foundation generally extends partially above water, although the device can also be applied for foundations situated wholly under water.

A suitable embodiment of the device is characterized in that the superstructure comprises side walls in the form of a lattice, for instance of mutually connected uprights, beams and cross-connections. Such a superstructure is strong, stiff and light, and is less susceptible to wind forces.

The device according to the invention can advantageously be applied in an assembly which also comprises a vessel in addition to the device. Such an assembly is highly suitable for offshore construction of a wind turbine or for arranging of components thereof on a vertically extending foundation present at sea. The assembly comprises for this purpose a vessel which is provided with the wind turbine components to be arranged, these comprising a hub, one or more blades and/or one or more tower sections for forming a tower of the wind turbine, and further with a lifting means for taking up the wind turbine components. The vessel co-acts with a device according to any one of the embodiments described in this application.

This co-action is expressed in yet another aspect of the invention, wherein a method is provided for offshore construction of a wind turbine or for arranging of components thereof on a vertically extending foundation present at sea. The inventive method makes use of the assembly and further comprises the steps of:

a) providing an assembly according to an embodiment of the invention;
    b) taking up a tower section with the lifting means and coupling it to the supply structure;
    c) moving the tower section coupled to the supply structure from outside the internal space into the internal space by displacing the supply structure and the tower section coupled thereto in horizontal direction;
    d) engaging the tower section, which was moved into the internal space, with the engaging structure; and
    e) lifting the engaged tower section in the internal space by displacing the engaging structure in vertical direction, whereby sufficient space is created under the relevant tower section for receiving another, underlying tower section in the internal space.

A substantially whole wind turbine can thus be constructed, wherein a tower section engaged with the engaging structure is lowered in the internal space to a position against an underlying tower section introduced into the internal space with the supply structure, and the relevant tower section is coupled to the underlying tower section.

Another embodiment of the invention provides a method wherein a tower section engaged with the engaging structure is lifted in the internal space to a position in which the tower section protrudes above the upper surface of the superstructure.

In some cases it may be advantageous to displace the engaging structure between securing positions and to anchor it in the securing positions with the superstructure. Forces acting on the engaging structure can then be transmitted to the superstructure and from there to the underlying foundation.

As a first step in a method according to an embodiment it is advantageous, prior to step b), to arrange an upper tower section in the engaging structure with the lifting means and thereby engage it so that the uppermost tower section protrudes above an upper surface of the superstructure, to anchor the engaging structure in a securing position, and to take the hub up from the vessel with the lifting means, arrange it on the first tower section and then secure it thereto.

In a method according to yet another embodiment, in a subsequent step at least one wind turbine blade is taken up with the lifting means and arranged with its blade root in a hub opening and secured therein. The blade root of a wind turbine blade taken up with the lifting means is here preferably engaged by a positioning means provided at the position of the upper surface of the superstructure, and the positioning means is moved in the horizontal and vertical directions in order to align the blade root with the hub opening and arrange it in the hub opening and secure it therein.

A whole wind turbine (mast, hub and blades) can be constructed in this way. According to an embodiment, a method is for this purpose provided wherein the steps b)-e) are repeated until a complete wind turbine tower of stacked and mutually connected tower sections has been constructed.

Once a complete wind turbine has been constructed, or other desired work has been carried out, in a method according to another embodiment the superstructure present around the constructed wind turbine tower can be released from the foundation, after which the superstructure is taken up with the lifting means and removed from the constructed wind turbine tower.

In order to facilitate the removal of the superstructure the superstructure is in an embodiment of the method openable by folding, and is removed in folded-open state. In another embodiment a method is provided wherein the superstructure has an open side wall and the superstructure is removed from around the wind turbine tower along the open side wall. For this purpose the open side wall preferably extends over substantially the whole height of the superstructure.

Finally, it is stated that the embodiments of the invention described in this patent application can be combined in any possible combination, and that each embodiment can individually form the subject-matter of a divisional patent application.

BRIEF DESCRIPTION OF THE DRAWINGS

The terms Fig., Figs., Figure, and Figures are used interchangeably in the specification to refer to the corresponding figures in the drawings.

The invention will now be further elucidated on the basis of the following figures and description of preferred embodiments, without the invention otherwise being limited thereto. In the figures.

DESCRIPTION OF THE INVENTION

Figure 1:
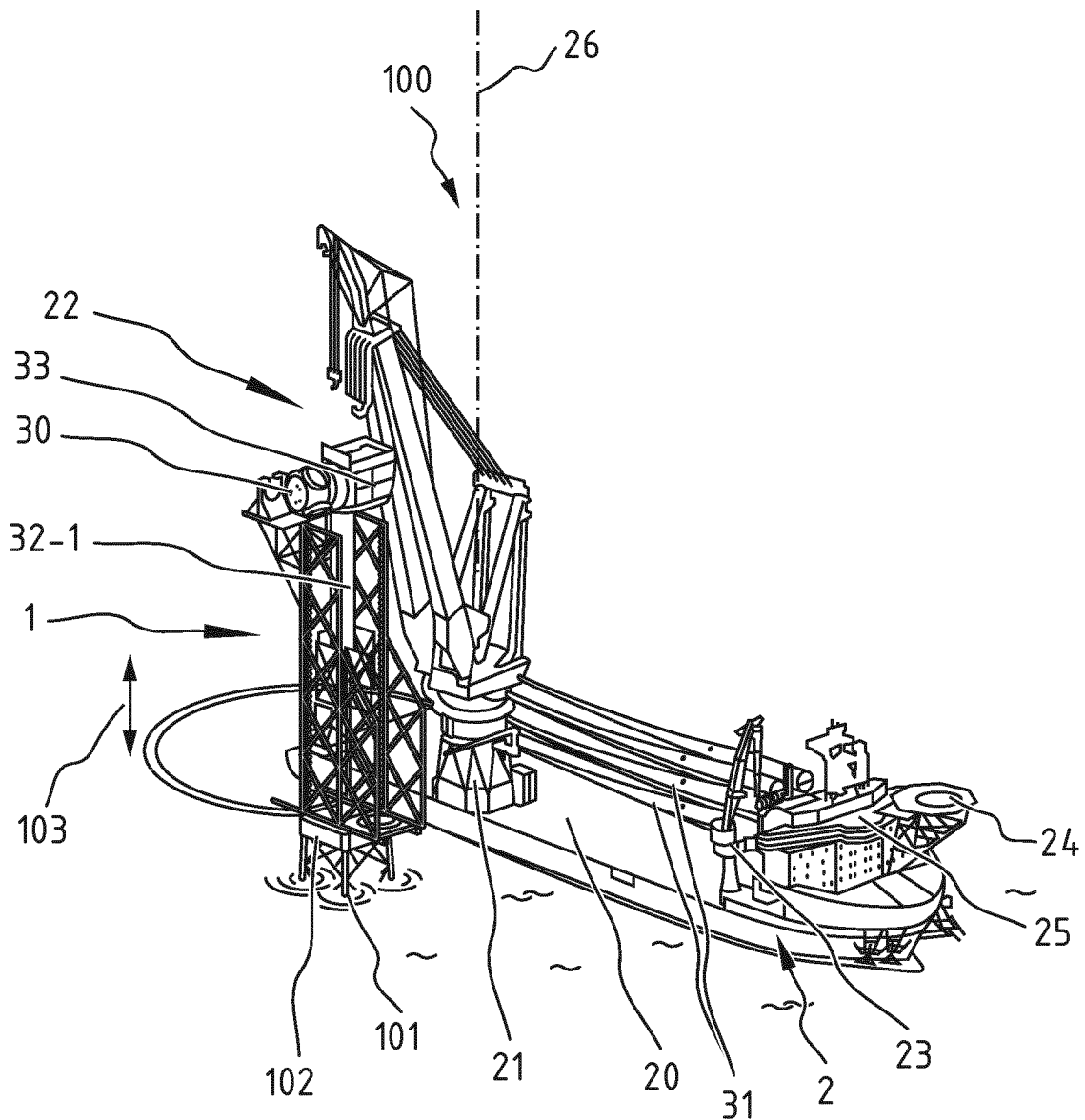
FIG. 1 shows a schematic perspective view of an assembly of a vessel and a device according to an embodiment of the invention.

Referring to FIG. 1, an assembly 100 according to an embodiment of the invention is shown. The device 100 is suitable for offshore construction of a wind turbine 3 or for arranging of components (30, 31, 32) thereof on a foundation 101 present at sea 4 and extending in vertical direction 103. In the shown embodiment the foundation 101 comprises a jacket foundation which is provided on an upper side thereof with a connecting plate 102 for the wind turbine. Because only an upper part of the jacket foundation 101 protrudes above the sea level 4, only this upper part is visible. The invention is not limited to this type of foundation. The foundation can thus for instance also comprise a monopile foundation or floating foundation.

The assembly 100 comprises a vessel 2, a deck 20 of which is provided with storage racks for wind turbine components (30, 31, 32, 33) to be arranged. The wind turbine components can comprise a hub 30 connected to a generator 33, and further one or more blades (31) and/or one or more tower sections (32-1, 32-2, . . . ) which in assembled state form a tower or mast 32 of the wind turbine 3. Further provided on the deck 20 of vessel 2 is a lifting means in the form of a compound lifting crane 22 which is configured to take up the wind turbine components (30, 31, 32) from deck 20 and carry them toward the jacket foundation 101. The lifting crane 22 is rotatable around a vertical axis 26 relative to deck 20 via a base 21. If desired, vessel 2 is provided with other auxiliary equipment, such as a second crane 23, a helipad 24 and a bridge 25. Vessel 2 can comprise a floating device (as shown), but can also be embodied as a jack-up platform (not shown) which is provided in known manner with legs which can be placed on the seabed. In this way the hull of such a jack-up platform can be brought above the sea surface, which can provide for additional stability. If desired, vessel 2 can be provided with a per se known swell compensation system.

The assembly 100 further comprises a device 1 according to the invention. In the embodiment shown in FIG. 2 the device 1 comprises an elongate superstructure 10 which extends from foundation 101 (the foundation being a monopile foundation 101 in this embodiment) in the vertical direction 103 between a lower surface 10-1 and an upper surface 10-2 thereof. The superstructure 10 is connected releasably to foundation 101, for instance via the annular flange 12 which is fixed to foundation 101, particularly to connecting plate 102, with a bolt connection. As can be seen, the foundation 101 extends partially above water.

Figure 2:
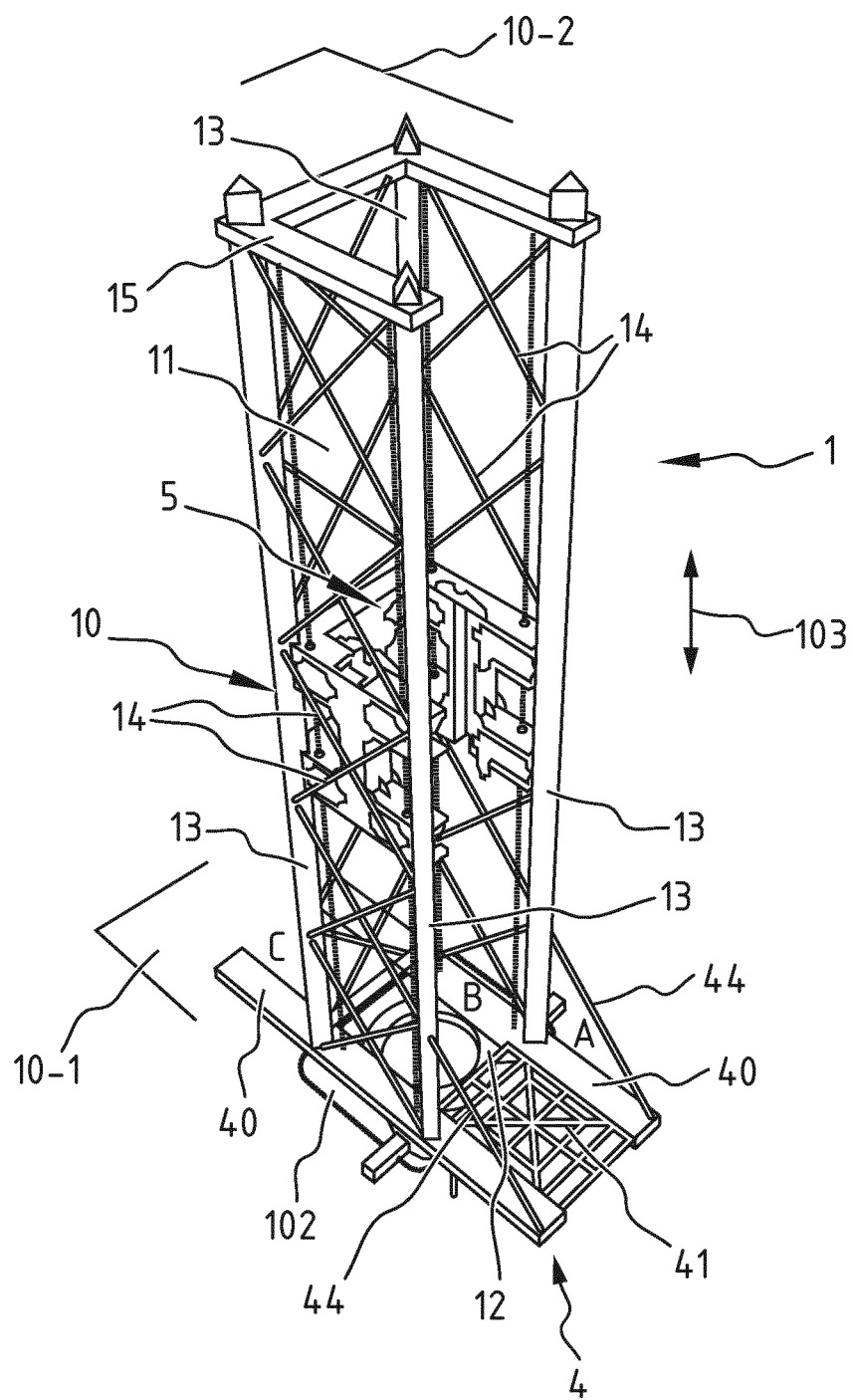
FIG. 2 shows a schematic perspective view of a superstructure according to an embodiment of the invention.
Figure 3:
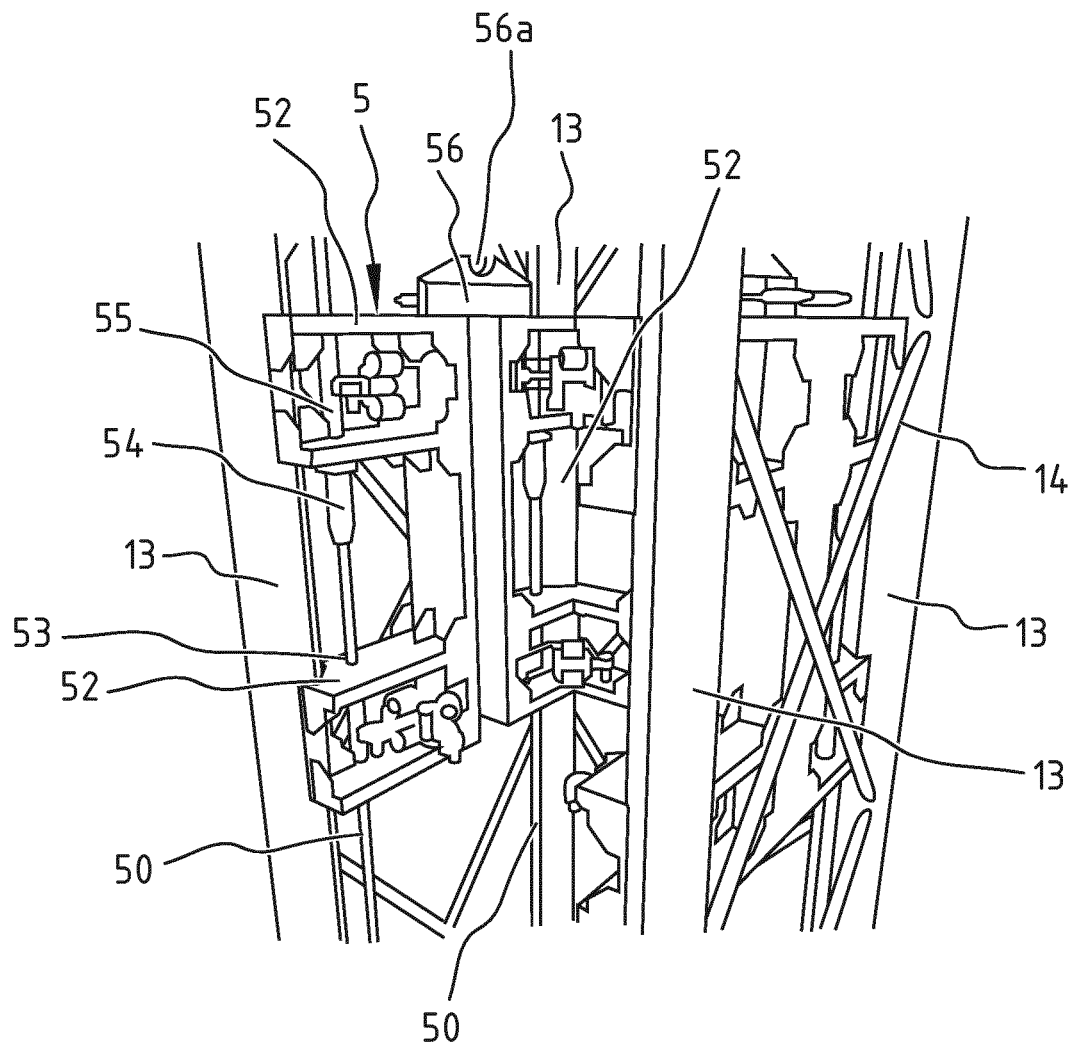
FIG. 3 shows a schematic perspective view of an engaging structure according to an embodiment of the invention.

According to FIG. 2, the superstructure 10 is constructed from a number of uprights 13 extending in vertical direction 103 and connected in the upper surface 10-2 by a U-shaped strengthening frame 15. Side walls of the superstructure 10 are formed by strengthening ribs 14 which run obliquely between uprights 13 and form together with two uprights 13 a lattice structure. The add-on structure 10 is accessible to a tower section (32-1, 32-2, . . . ) in that a side wall thereof is kept open, i.e. is not provided with the strengthening ribs 14. The open side wall lies on the open side of the U-shaped strengthening frame 15 and is therefore not bounded by a rib of strengthening frame 15. The open side wall makes an internal space 11 of superstructure 10 accessible to a tower section (32-1, 32-2, . . . ).

Situated in the lower surface 10-1 is a supply structure 4 for a tower section (32-1, 32-2, . . . ). The supply structure 4 comprises two support beams 40 extending mutually parallel in lower surface 10-1 and together forming a support surface for a horizontally slidable floor 41. The support beams 40 are connected with pull rods 44 to uprights 13 of superstructure 10. The floor is slidable between a position A outside the internal space and a position B lying inside the internal space 11. With floor 41 a tower section (32-1, 32-2, . . . ) can be coupled in known manner, for instance with clamps or bolts. As can be seen in FIG. 2, the support beams 40—and so the support surface formed by the two as well-protrude from superstructure 10 on both sides. This allows floor 41 to be slid not only from the position A outside internal space 11 to the position B lying inside internal space 11, but also on to a position C, lying outside internal space 11, on a side of superstructure 10 lying opposite relative to position A. The supply structure 4 is configured in the described manner to move a tower section (32-1, 32-2, . . . ) coupled thereto from outside internal space 11 into internal space 11 by a horizontal displacement.

Figure 23:
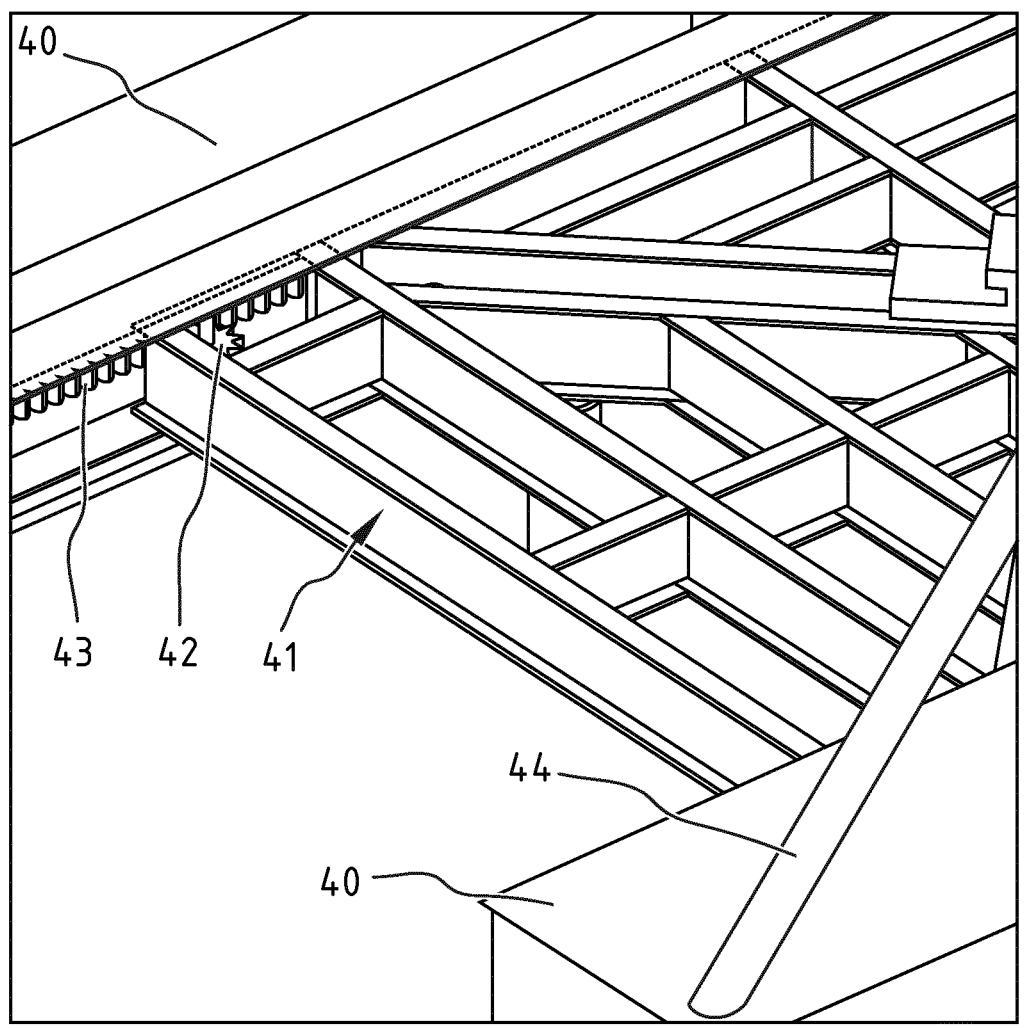
FIG. 23 shows a schematic perspective view of supply structure according to an embodiment of the invention.

According to an embodiment shown in FIG. 23, the horizontal sliding of floor 41 relative to support beams 40 can take place using a rack and pinion system (42, 43). A rack 43 is for this purpose incorporated in both support beams 40 in the lower surface 10-1. The rack 43 co-acts with a toothed wheel 42 which is mounted on floor 41. In a suitable embodiment a toothed wheel 42 is arranged in each corner of the floor 41, although other positions are also possible.

Figure 14:
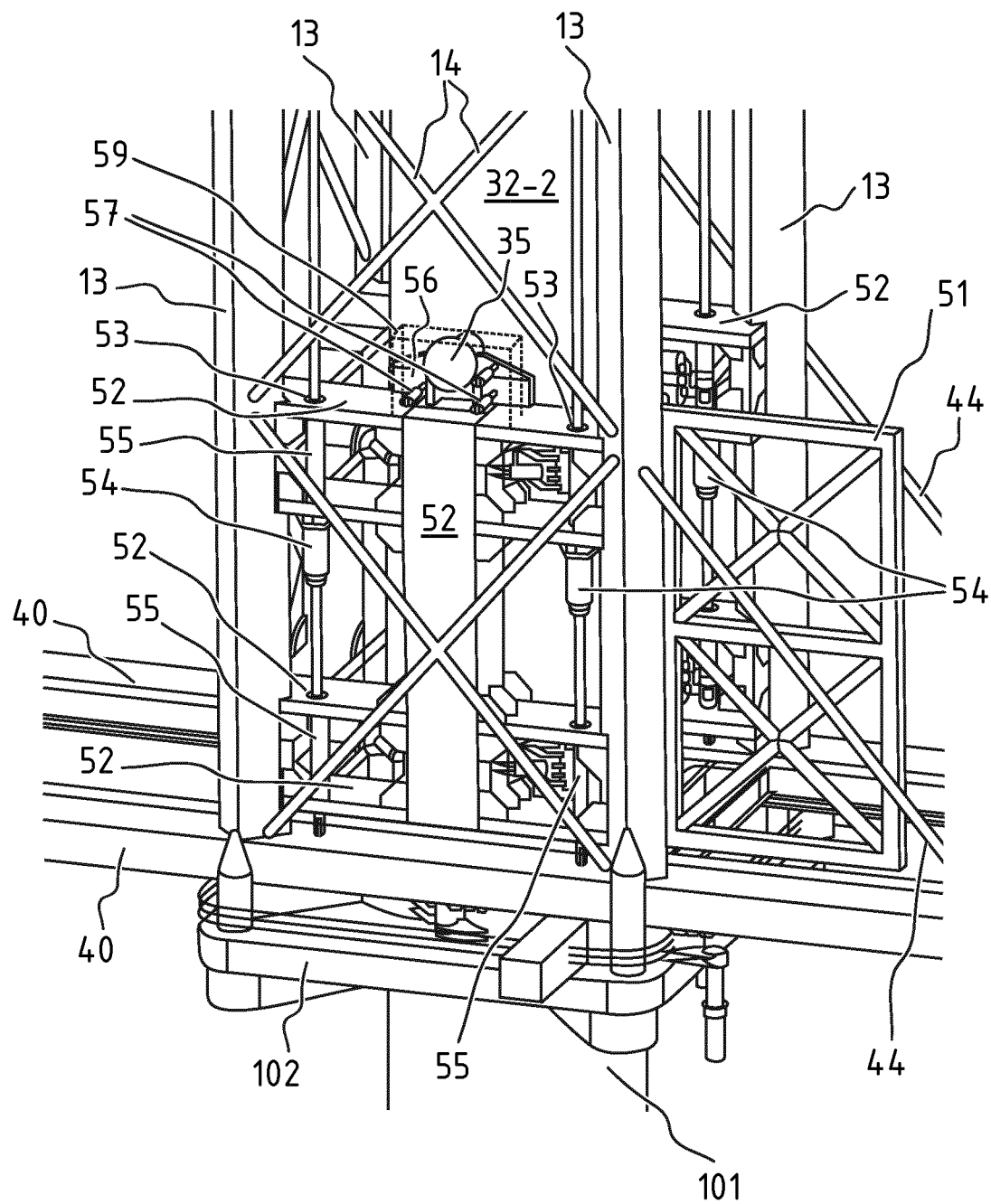

Superstructure 10 is further provided with an engaging structure 5 for a tower section (32-1, 32-2, . . . ), received in internal space 11 for displacement in the vertical direction 103. The engaging structure 5 is cage-like and constructed from mutually connected support beams 52 which together form a structural whole. Engaging structure 5 can have an open side which connects to the open side wall of superstructure 10. In an improved embodiment (see FIG. 14) the open side can comprise a lattice door 51. The door 51 can thus form together with the rest of the engaging structure 5 a relatively rigid cage structure when door 51 is closed.

Engaging structure 5 is suspended from cables 50, preferably of steel, which are tensioned between the strengthening frame 15 in upper surface 10-2 and the support beams 40 in lower surface 10-1 and which run through openings 53 made in some support beams 52. Engaging structure 5 is further provided with strand jacks 54, connected to support beams 52, through which the cables 50 run. A strand jack comprises a hollow hydraulic cylinder provided with a central opening through which a cable 50 runs. The cylinder is provided at both outer ends with a clamp which can be clamped round the cable 50. The string jack can climb or fall along the cable 50. Climbing can for instance take place by releasing an upper clamp of the cylinder in a retracted position while a lower clamp clamps round the cable 50, imparting a stroke to the cylinder (extending it) and securing the upper clamp on cable 50 in that position. The lower clamp is then released and the cylinder retracted, after which the lower clamp is fixed again. For falling, a reverse order is kept to. In the embodiment shown in FIG. 14 four strand jacks 54 are arranged, one on each corner point of engaging structure 5. If desired, engaging structure 5 can be suspended from cables 50 with more strand jacks 54. Because the strand jacks 54 are connected to the support beams 52, a climbing or falling of strand jacks 54 along the cables 50 will also make the engaging structure 5 climb or fall along cables 50 as a whole. By clamping both clamps of the strand jacks 54 round cables 50 the strand jacks 54 (and so engaging structure 5 as well) can be secured in securing positions relative to superstructure 10. The shown embodiment allows relatively great forces to be absorbed while still allowing good movability along cables 50 in vertical direction. It will be apparent that other vertical moving means can be applied. It is thus possible to arrange a rack and pinion system in uprights 13 or to suspend the engaging structure 5 from cables, wherein the cables can be taken in or payed out with winches arranged on support frame 15 in the upper surface 10-2. As further shown, guide sleeves 55 arranged on support beams 52 can provide for a better guiding of the engaging structure 5 along the cables 50.

Figure 9:
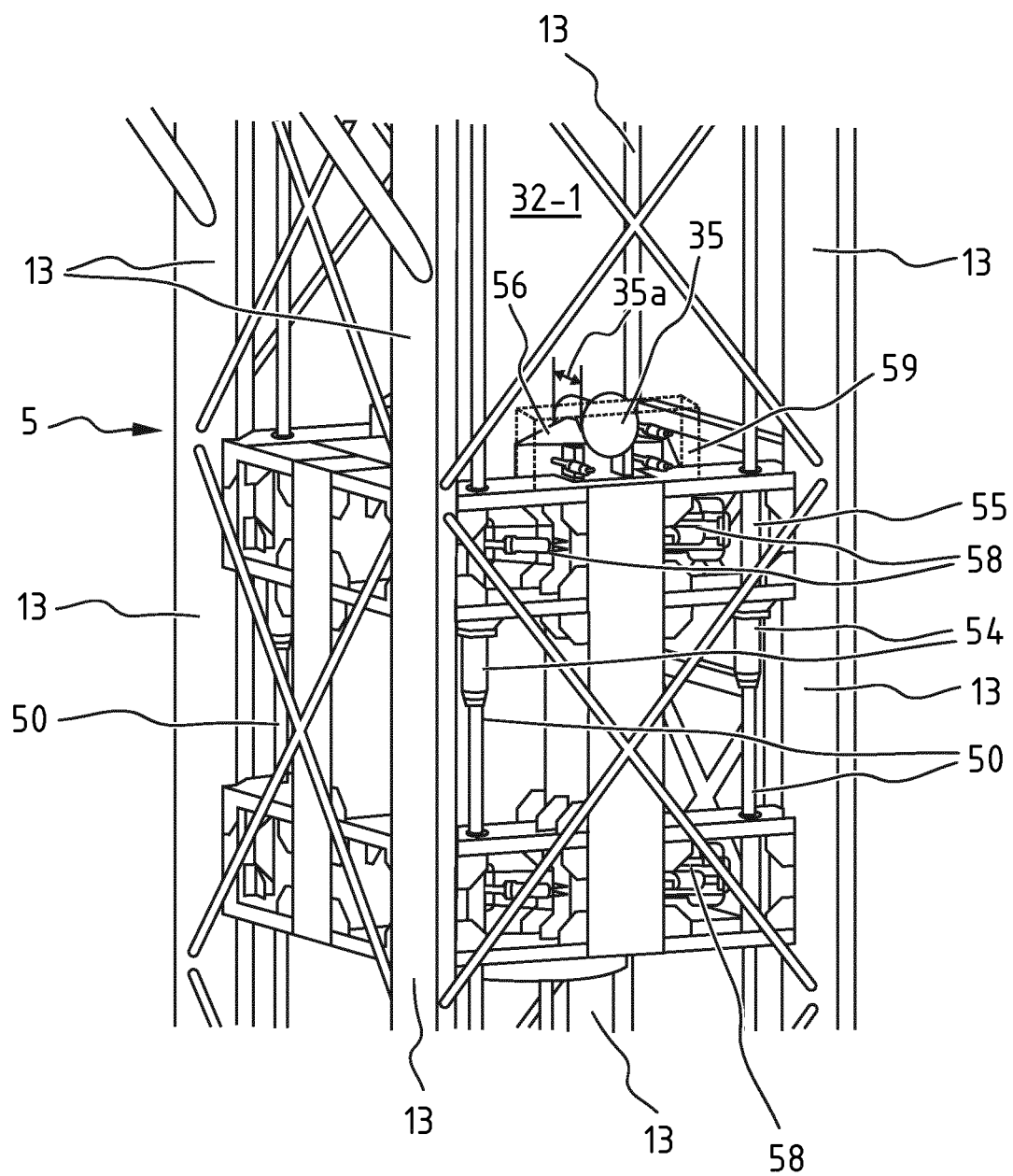
Figure 10:
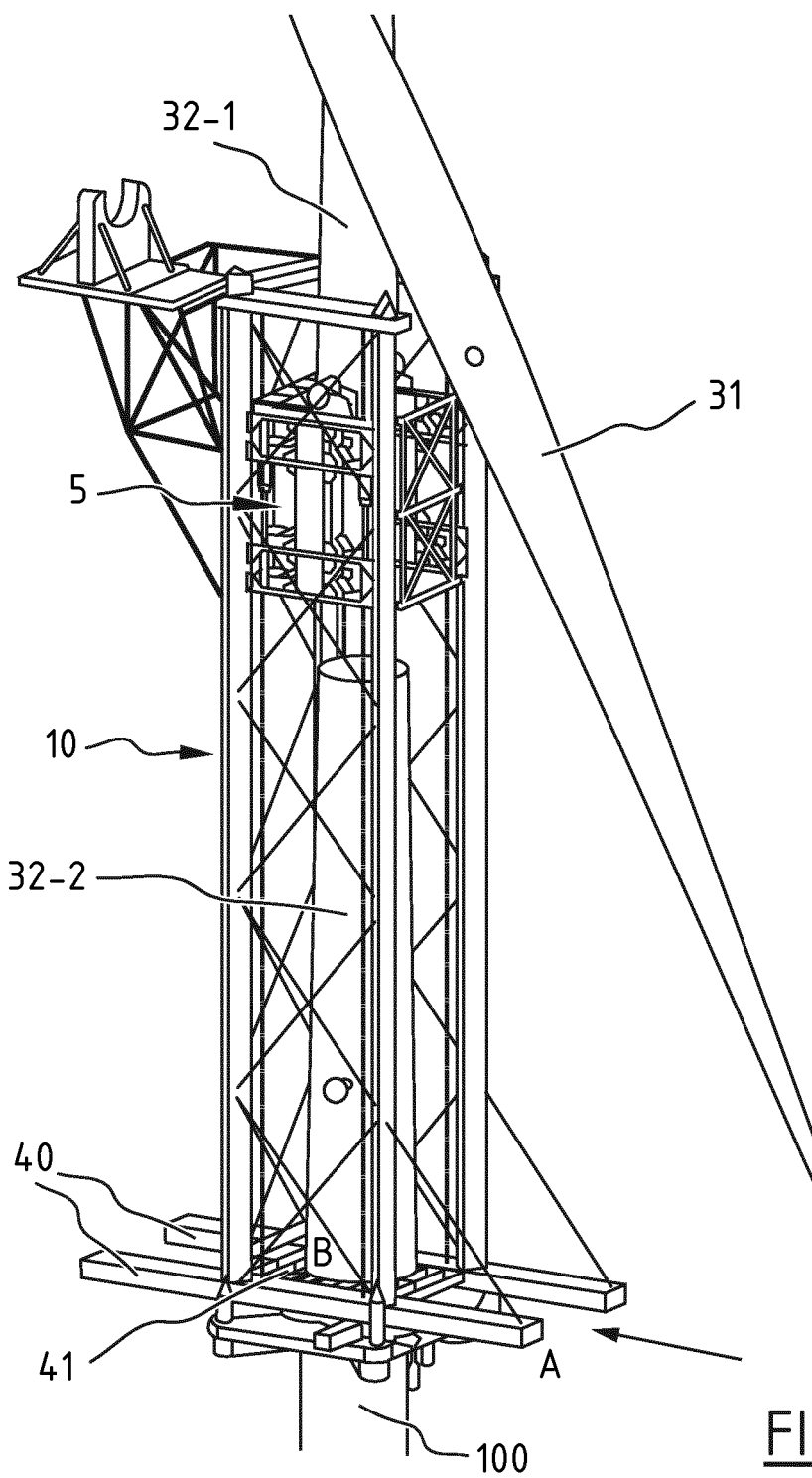

Engaging structure 5 is further provided with an engaging plate 56 for a tower section (32-1, 32-2, . . . ). The engaging plate 56 is provided on an upper side with a recess 56a in which a trunnion 35 arranged on an outer wall of the engaged tower section (32-1, 32-2, . . . ) can be received. In the shown embodiment the engaging structure 5 is provided with two opposite engaging plates 56 which engage on opposite sides of the engaged tower section (32-1, 32-2 . . . ) on a trunnion 35 arranged on the outer wall of the engaged tower section (32-1, 32-2, . . . ). Each engaging plate 56 is moveable toward and away from the tower section (32-1, 32-2 . . . ) in a horizontal direction. For this purpose hydraulic cylinders 57 which engage on the engaging plate 56 are arranged on horizontally running support beams 52. In the embodiment shown in FIG. 14 the connection 59 between the hydraulic cylinders 57 and the support beam 52 is shown in broken lines for the sake of visibility. The horizontal movability of engaging plates 56 serves two purposes. Firstly, tower sections (32-1, 32-2 . . . ) with different diameters can be engaged in this way. Secondly, the engaging structure 5 can thus be moved along a tower section (32-1, 32-2, . . . ) without the engaging plates 56 coming into contact with trunnions 35 arranged on the outer wall of the tower section. This is because the engaging plates 56 can be moved further away from the outer wall of the tower section than a protrusion length 35a of the trunnions 35. The protrusion length 35a is shown in FIG. 9.

Figure 15:
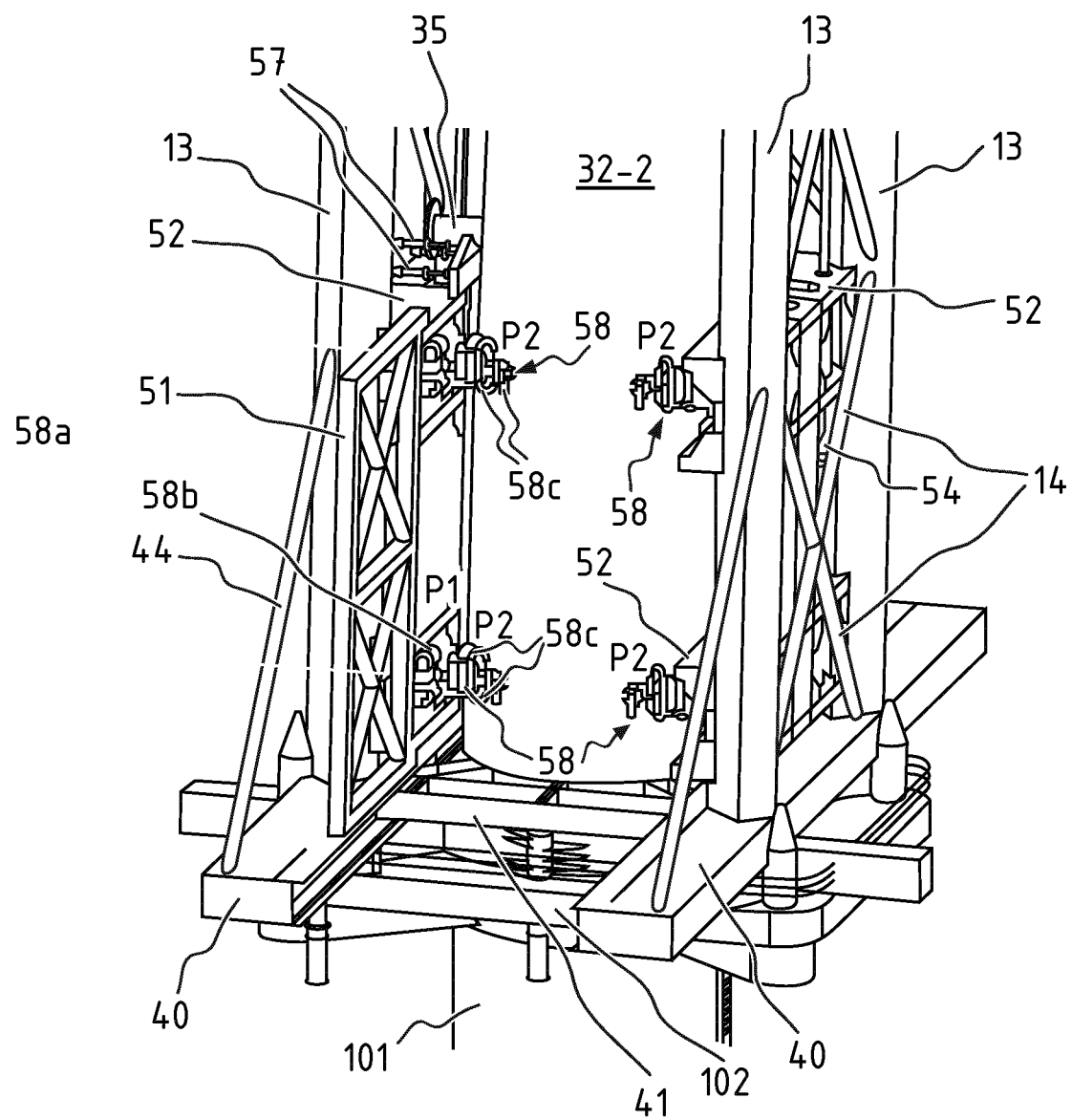

As can be seen clearly in FIG. 15, support beams 52 of engaging structure 5 are also provided with engaging means 58, placed at vertical distance 58a, for a wall part of a tower section (32-1, 32-2, . . . ). The engaging means 58 can be moved with hydraulic cylinders 58b from a position P1 removed from the tower section (32-1, 32-2, . . . ) to a position P2 in which a wall part of the tower section (32-1, 32-2, . . . ) is engaged by the engaging means 58. In the shown embodiment the engaging means 58 are provided with two rollers 58c which can be placed against the wall part of the tower section (32-1, 32-2, . . . ). These can also be rubber, plastic or metal plates. As can be seen in FIG. 15, four engaging means 58 are connected for movement between positions P1 and P2 to the support beams 52, this in two horizontal planes positioned at vertical distance 58a. The engaging means 58 are thus configured to hold the engaged tower section (32-1, 32-2, . . . ) upright in that they can absorb a moment around a horizontal axis.

Figure 4:
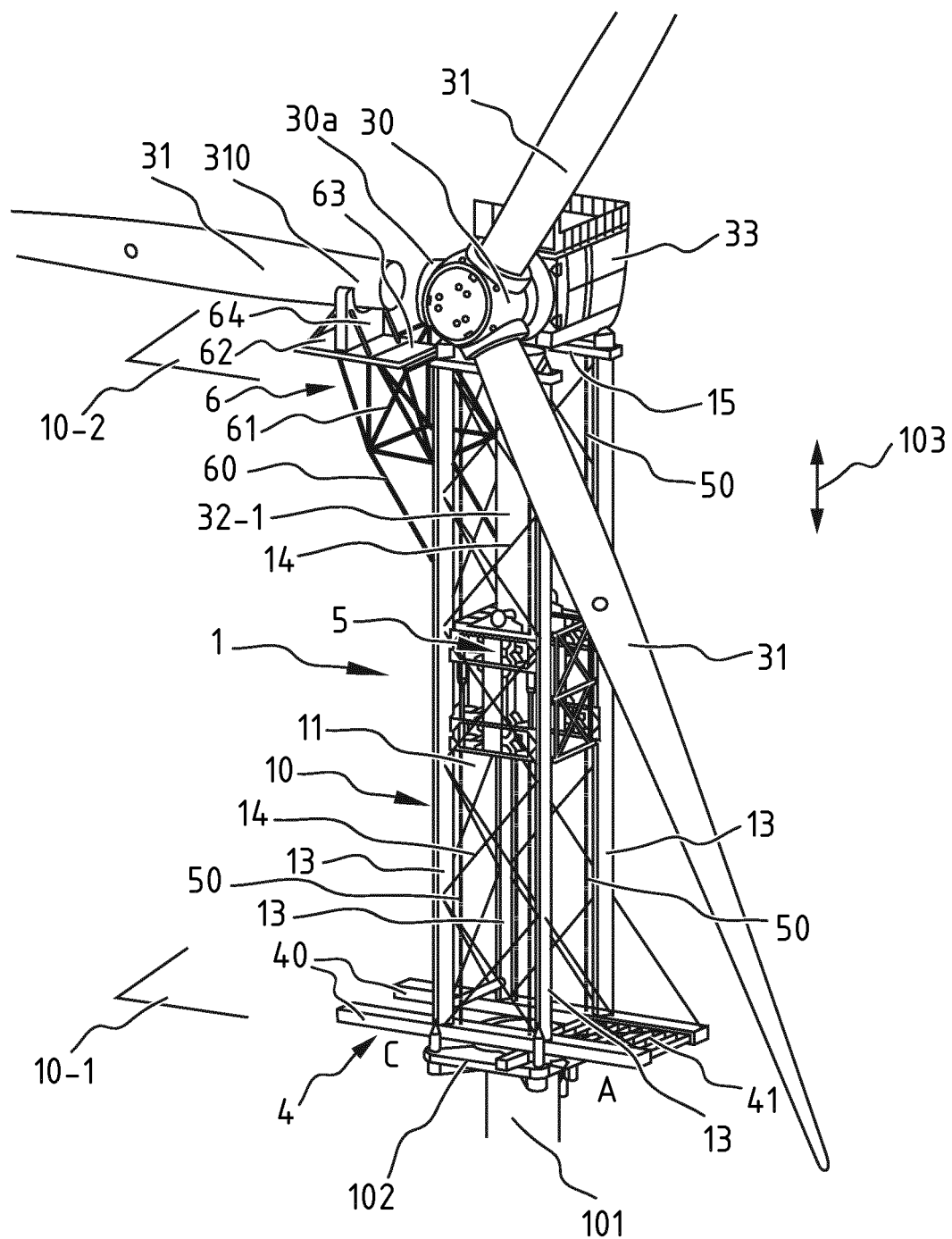
FIG. 4-22 show schematically different steps of an embodiment of the method according to the invention.
Figure 5:
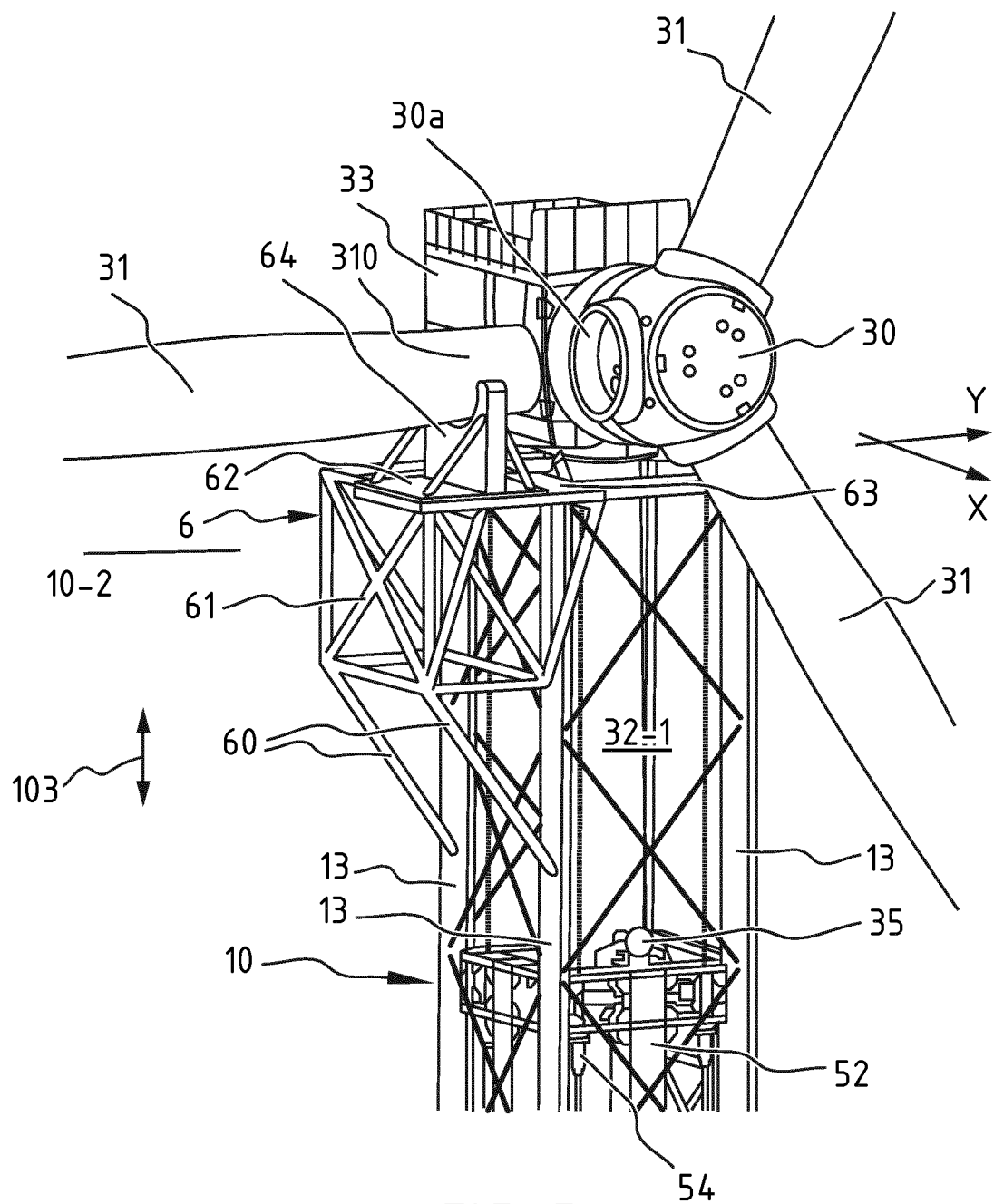
Figure 6:
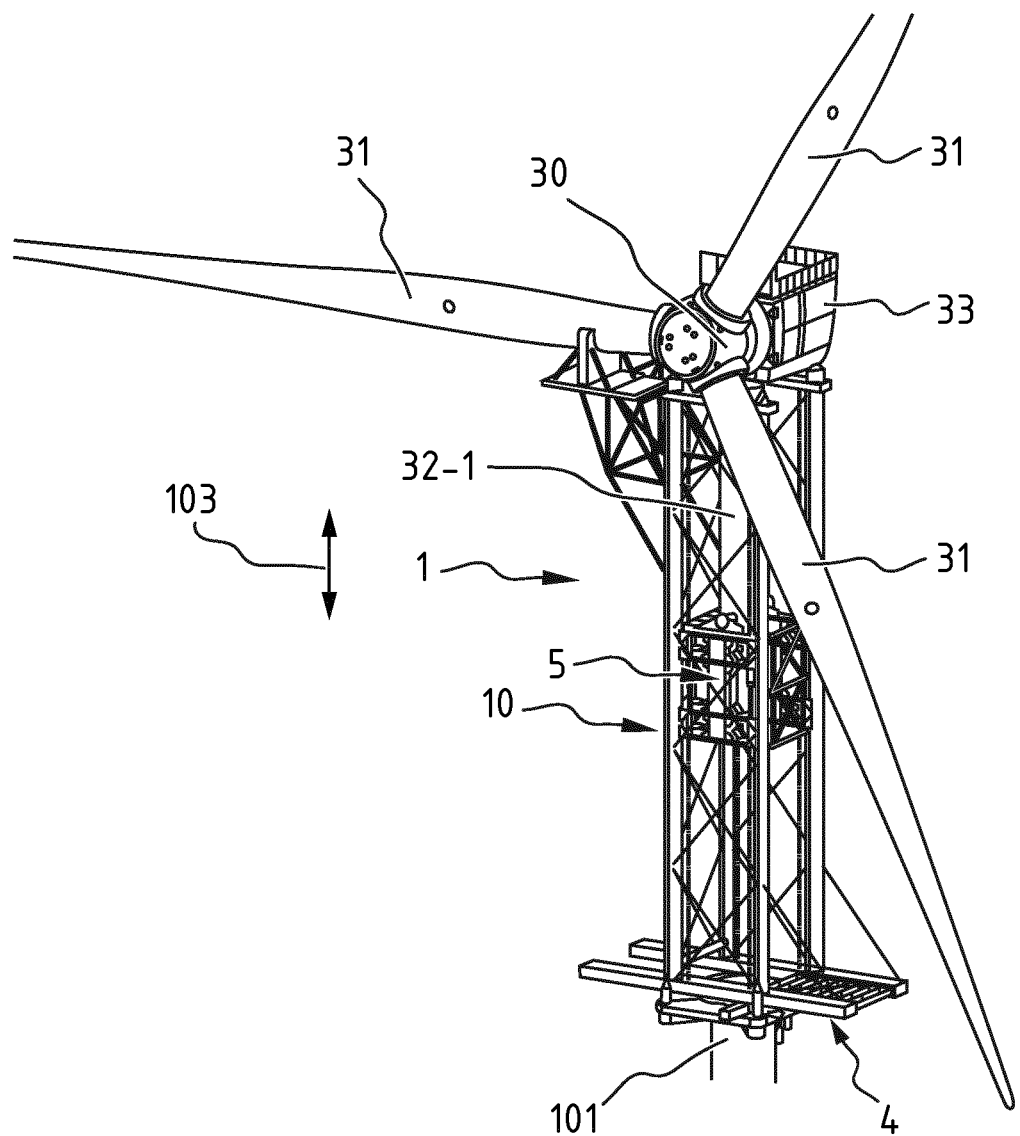

As shown clearly in FIGS. 4 and 5, an embodiment of device 1 can further be characterized in that the superstructure 10 comprises at the position of the upper surface (10-2) a positioning means 6 for a root 310 of a wind turbine blade 31. The positioning means 6 comprises a lattice cage 61 connected via ribs 60 to superstructure 10 and provided on an upper side with a positioning plate 62 which is movable in X- and Y-direction. The positioning plate 62 can for instance be connected with hydraulic cylinders (not shown) to a fixed upper plate 63 of lattice cage 61. Arranged on positioning plate 62 is an upright support 64, an upper side of which is profiled in order to be able to receive a wall part of the root 310 of the wind turbine blade 31.

The above shows that engaging structure 5 is configured by means of the engaging plate 56 and the engaging means 58 to engage a tower section (32-1, 32-2, . . . ) and then displace it in the internal space 11 in vertical direction 103 by means of the strand jacks co-acting with cables 50. It is thus possible to lift a tower section (32-1, 32-2, . . . ), whereby sufficient space is created under the relevant tower section (32-1, 32-2, . . . ) for receiving another, underlying tower section (32-1, 32-2, . . . ) in the internal space 11. This underlying tower section (32-1, 32-2, . . . ) can for instance be moved into the internal space 11 by an inward sliding of the floor 41. In this way a wind turbine mast can be constructed from the bottom up, as will be further illustrated below.

The different steps of an embodiment of a method for offshore construction of a wind turbine using the invented device 1 are illustrated in FIGS. 1-23.

Referring to FIG. 1, the superstructure 10 is taken up with lifting crane 22 and placed on foundation 101, and secured thereto. A first tower section 32-1 is then taken up with the lifting crane and moved from above into the internal space 11 of superstructure 10 and into engaging structure 5, which is for this purpose secured in an upper half of the superstructure 10. Two opposite trunnions 35 of the first tower section 32-1 are here moved into the recesses 56a provided on an upper side of engaging plates 56. The first tower section 32-1 is then uncoupled from lifting crane 22 and the first tower section 32-1 rests in the engaging plates 56 of engaging structure 5. The vertical position of engaging structure 5 is here high enough for an upper part of the first tower section 32-1 to protrude above the upper surface 10-2. A hub 30 with generator 33 is then taken up from the deck 20 of vessel 2 with lifting crane 22 and placed on first tower section 32-1, and connected here. This situation is shown in FIG. 1.

A wind turbine blade 31 is then taken up from deck 20 with lifting crane 22 and slid with its blade root 310 into a hub opening 30a of hub 30, and secured therein. In FIG. 4 two wind turbine blades 31 have already been connected to hub 30 in this manner. As shown for a third wind turbine blade 31, the sliding of the blade root 310 into the hub opening 30a takes place via the positioning means 6. For this purpose the blade root 310 of blade 31 is placed in substantially horizontal position into the upright support 64 with lifting crane 22, wherein the blade 31 remains suspended in lifting crane 22. The movements in the horizontal plane with the (X, Y) positioning plate 62 are then in any case controlled (preferably remotely) such that the root 310 is positioned and aligned precisely opposite hub opening 30a and is then slid therein and secured, for instance with a bolt connection. The partially constructed state shown in FIG. 6 thus results.

Figure 7:
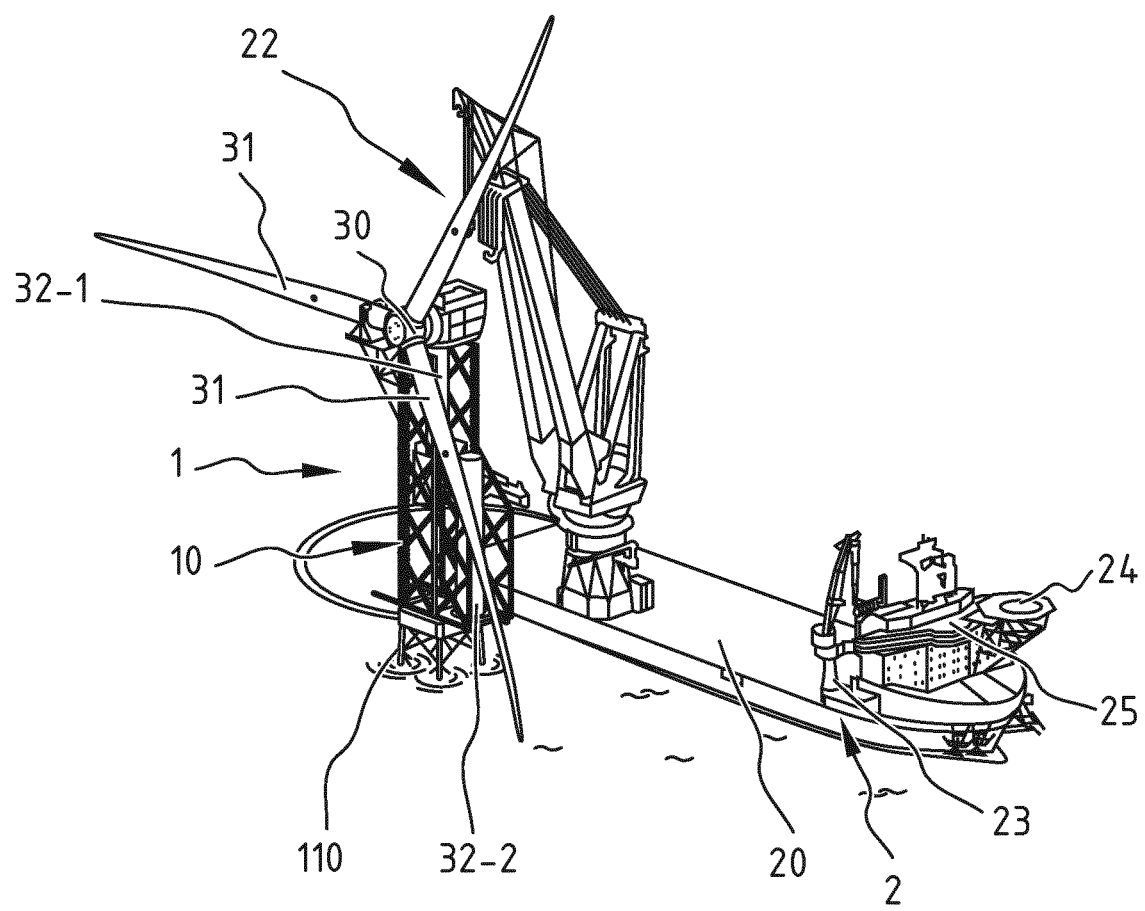
Figure 8:
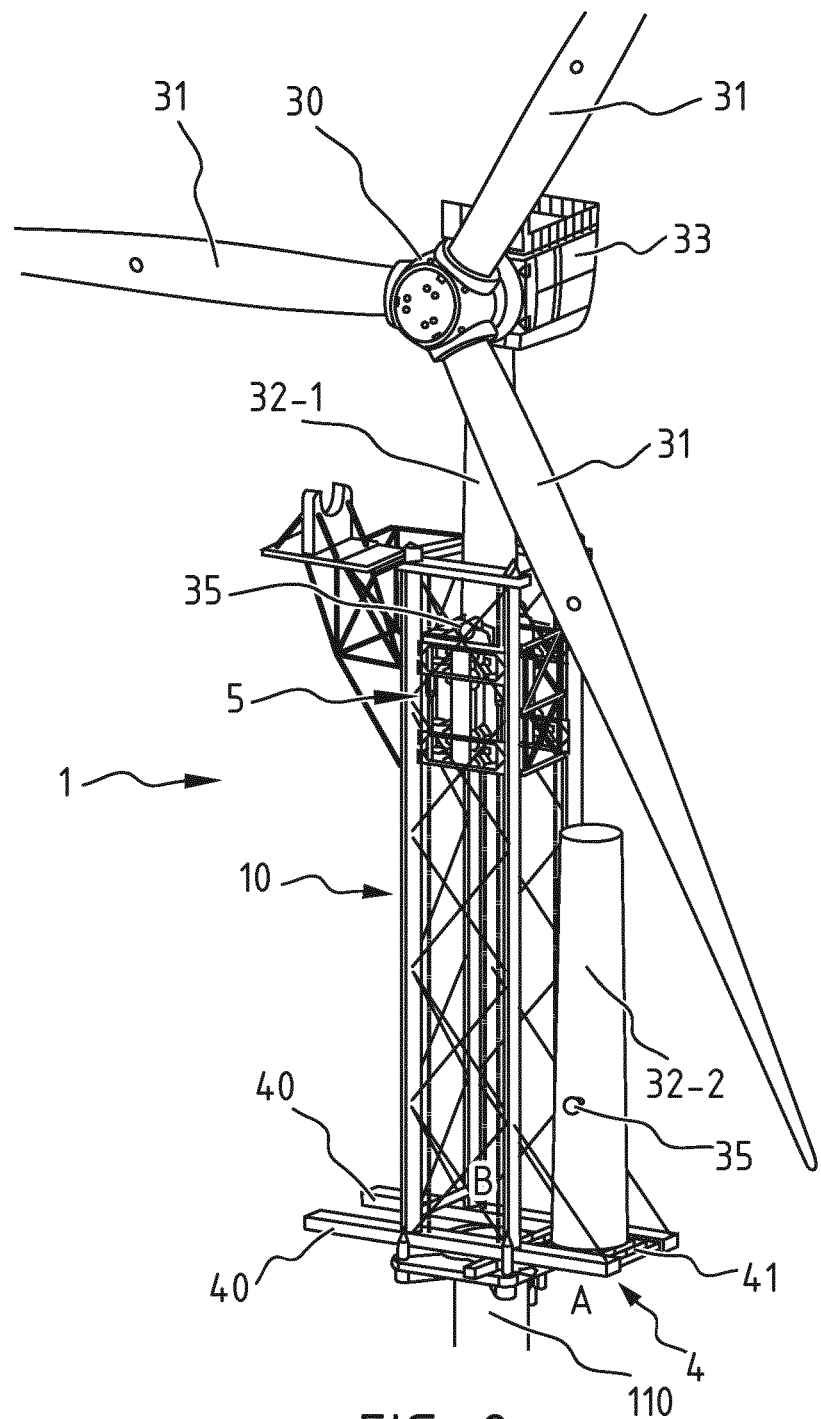

In a subsequent step a second tower section 32-2 is taken up from deck 20 of vessel 2 with lifting crane 22 and set down on the floor 41 of supply structure 4, and coupled thereto. The coupling can for instance be done using hydraulic clamps or by means of a bolt connection. The floor 41 here lies outside the internal space 11 in the position A as can be seen in FIGS. 7 and 8. The second tower section 32-2 coupled to the floor 41 of supply structure 4 is then moved from the position A outside internal space 11 into internal space 11, into the position B. According to FIG. 10, this is done by sliding the floor 41 of supply structure 4 and the second tower section 32-2 coupled thereto in horizontal direction. Meanwhile, the first tower section 32-1 remains suspended in the engaging plates 56 of engaging structure 5, as shown in detail in FIG. 9.

Figure 12:
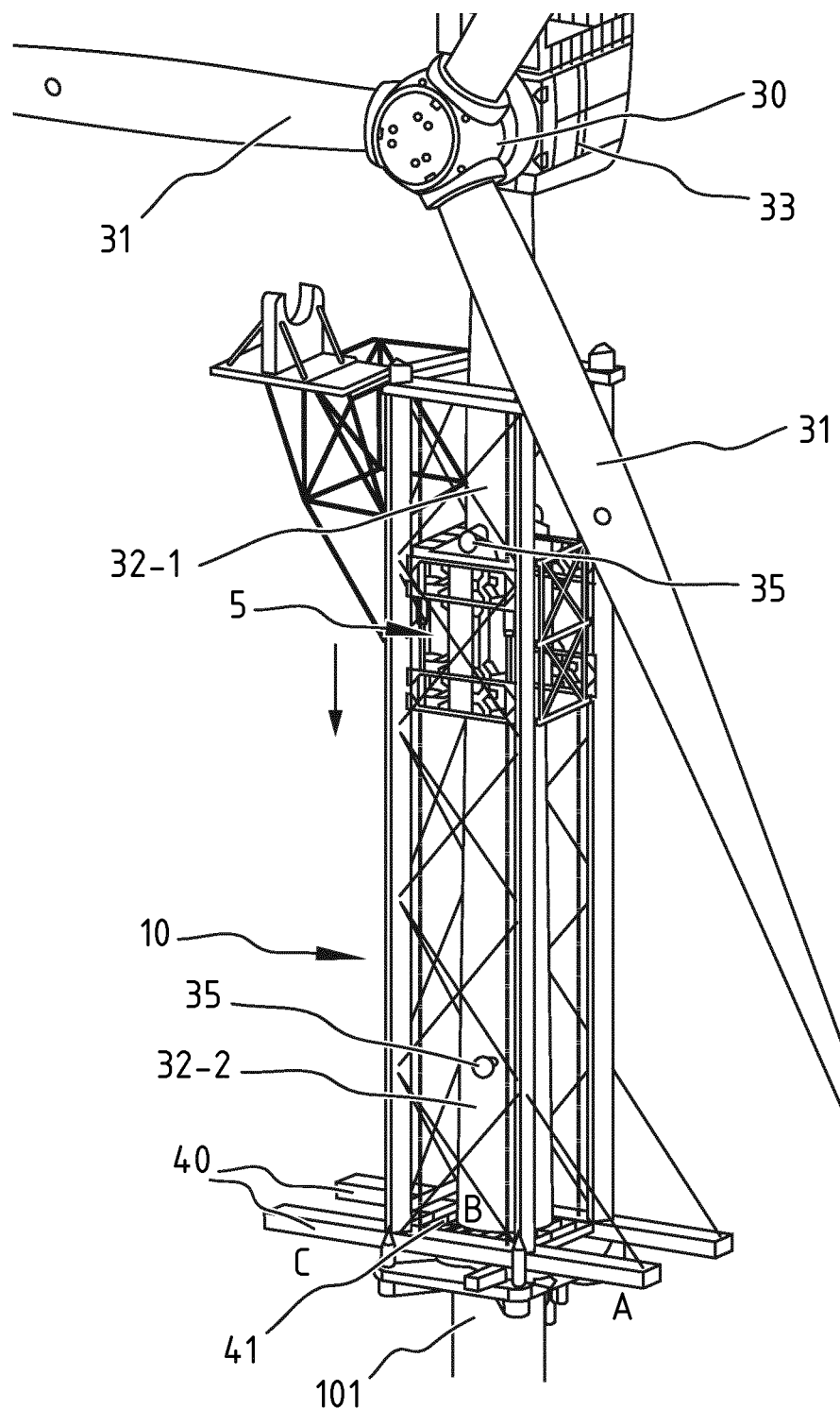

Referring to FIG. 12, the engaging structure 5 is lowered along cables 50 with the strand jacks 54 until a lower edge of the first tower section 32-1 hanging from engaging plates 56 comes into contact with an upper edge of the second tower section 32-2 coupled to floor 41. The two tower sections 32-1 and 32-2 are then secured to each other, for instance by connecting corresponding flanges thereof using bolts, as shown in FIG. 12. The first tower section 32-1 is then uncoupled from the engaging structure 5. This can for instance be done by moving engaging means 58 into the non-engaged position P1, moving engaging plates 56 downward (along with the rest of engaging structure 5) so that the trunnions come loose from engaging plates 56, and moving engaging plates 56 a distance away from the wall of the tower sections 32-1 and 32-2. This allows engaging plate 56 to be moved downward over the trunnion 35 of the second (underlying) tower section 32-2.

Figure 13:
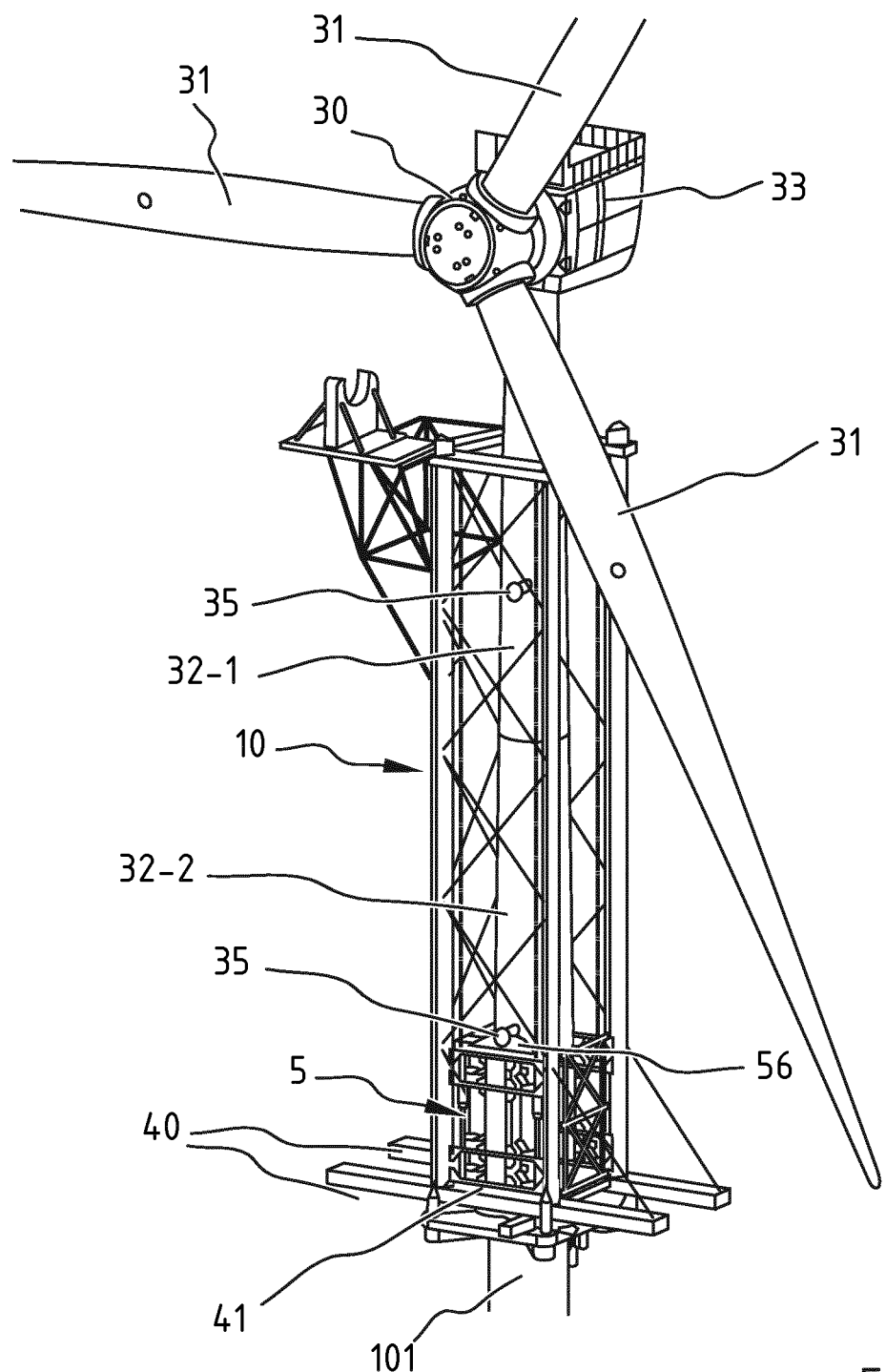

Referring to FIG. 13, the trunnion 35 of the second tower section 32-2 is then engaged with the engaging plates 56. This situation is shown in more detail in FIGS. 14 and 15. Engaging means 58 are here in the engaged position P2.

Figure 16:
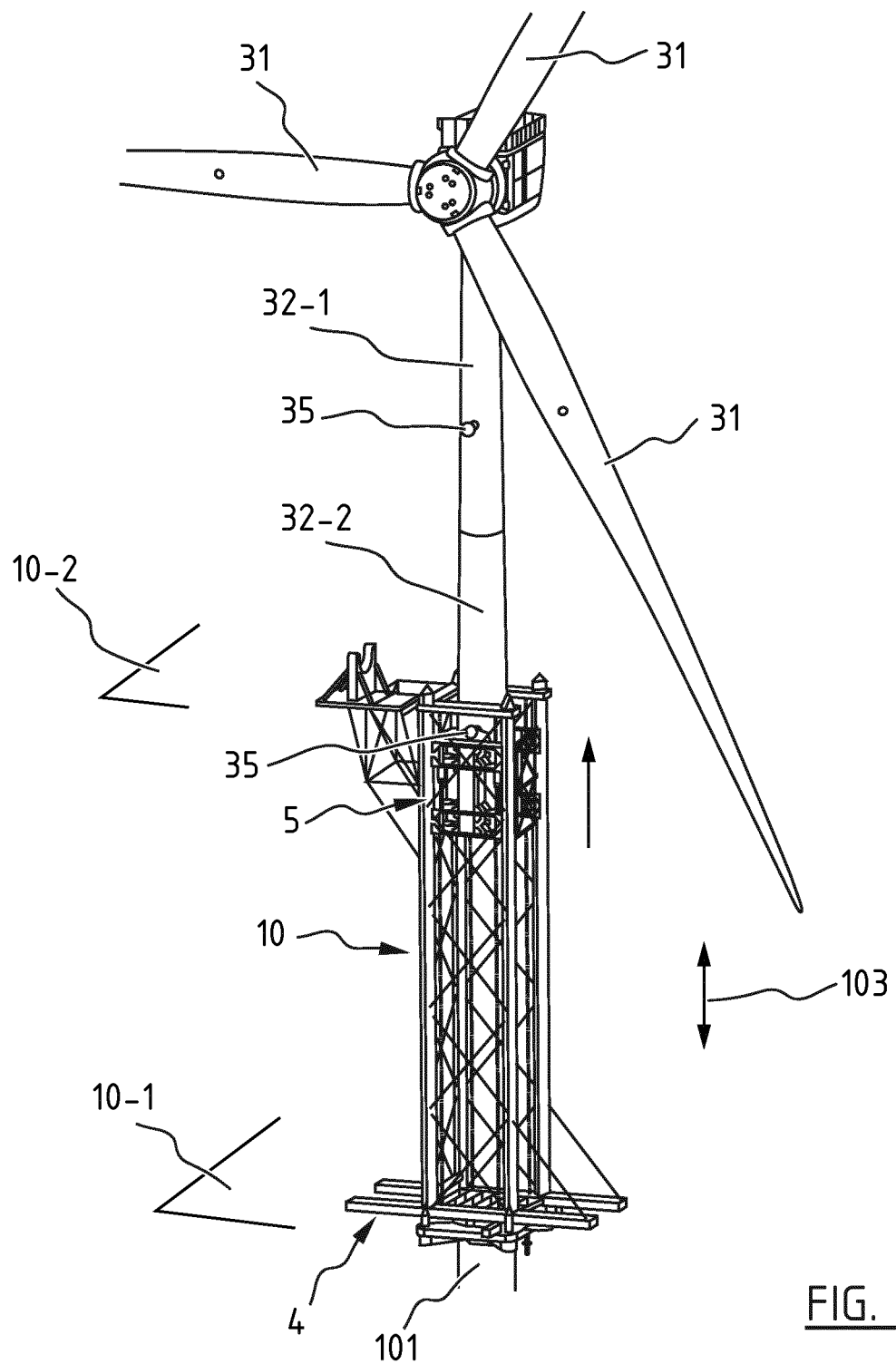
Figure 17:
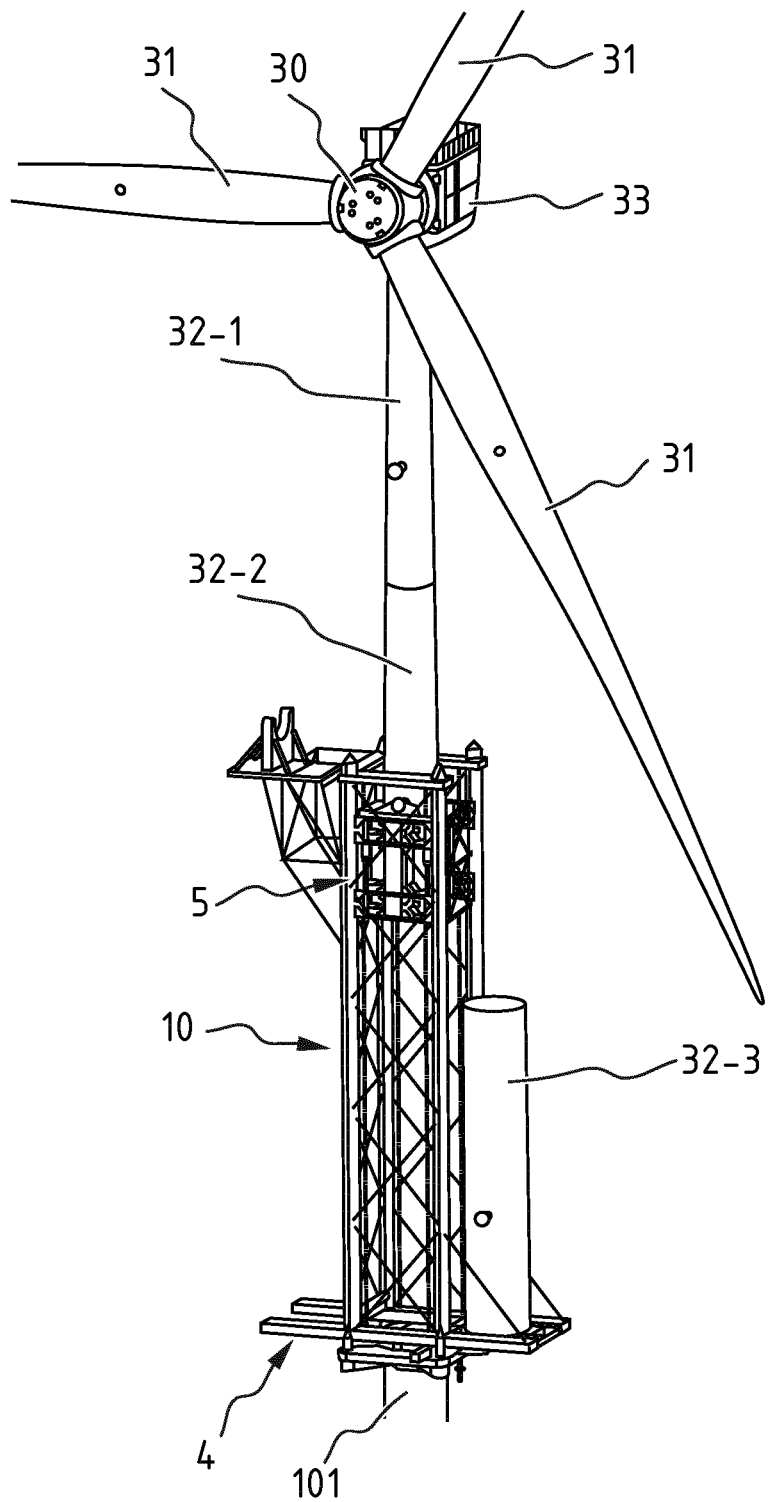
Figure 18:
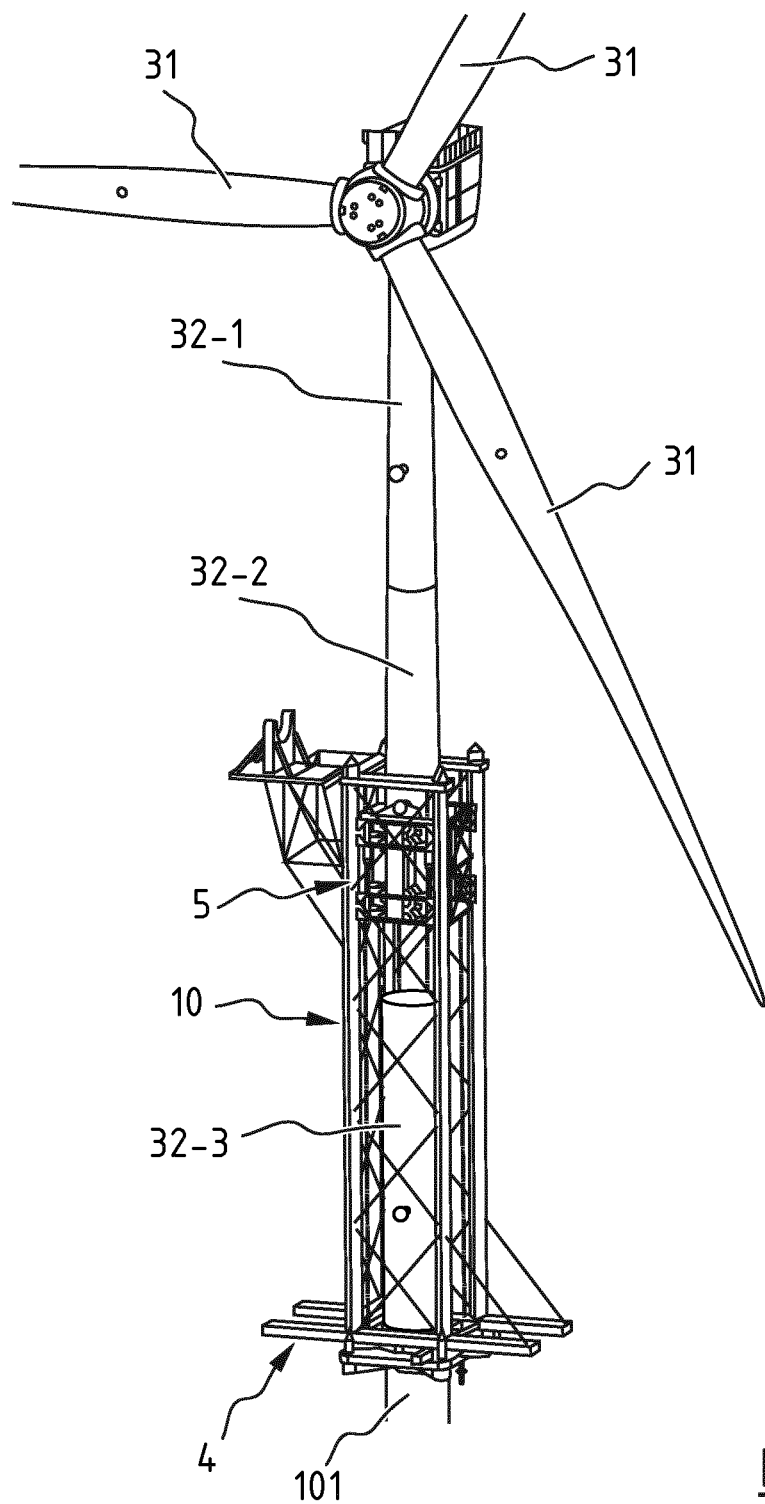
Figure 19:
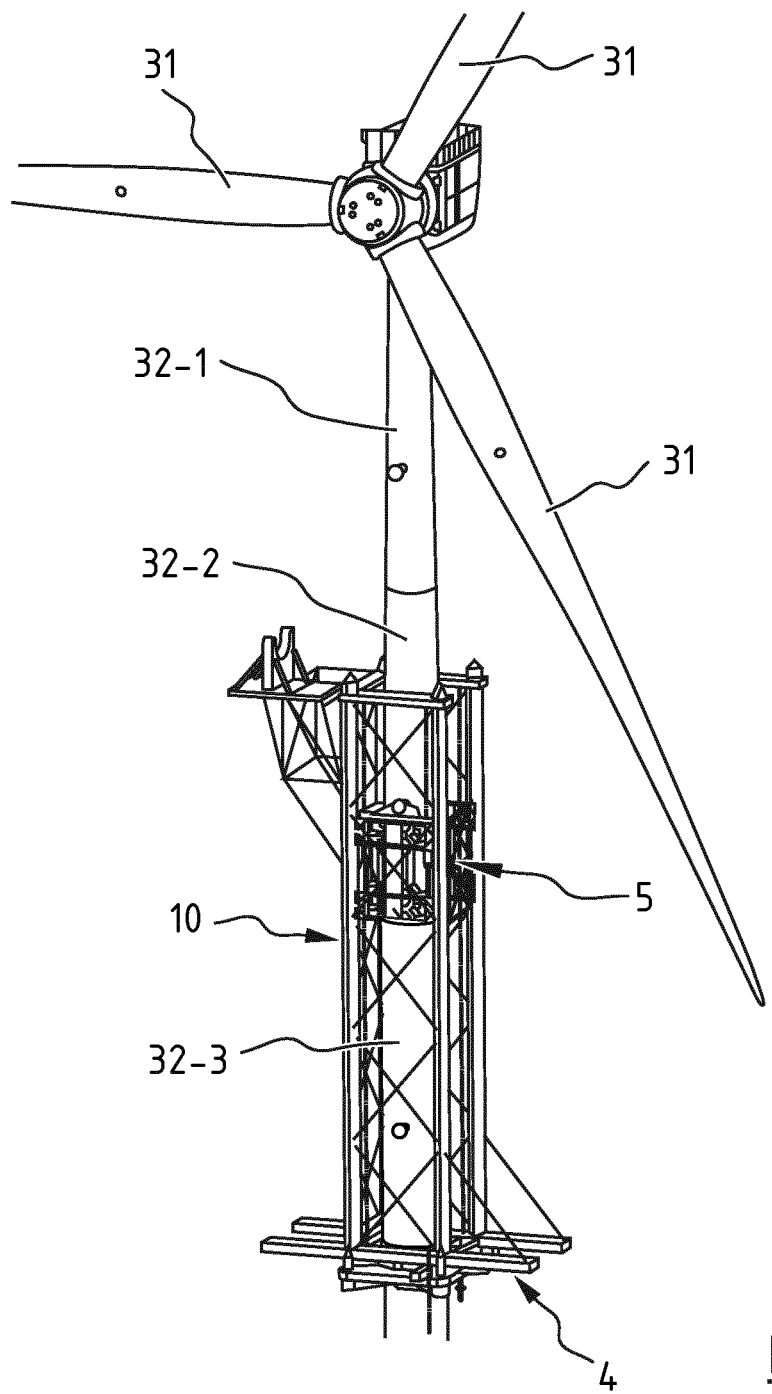
Figure 20:
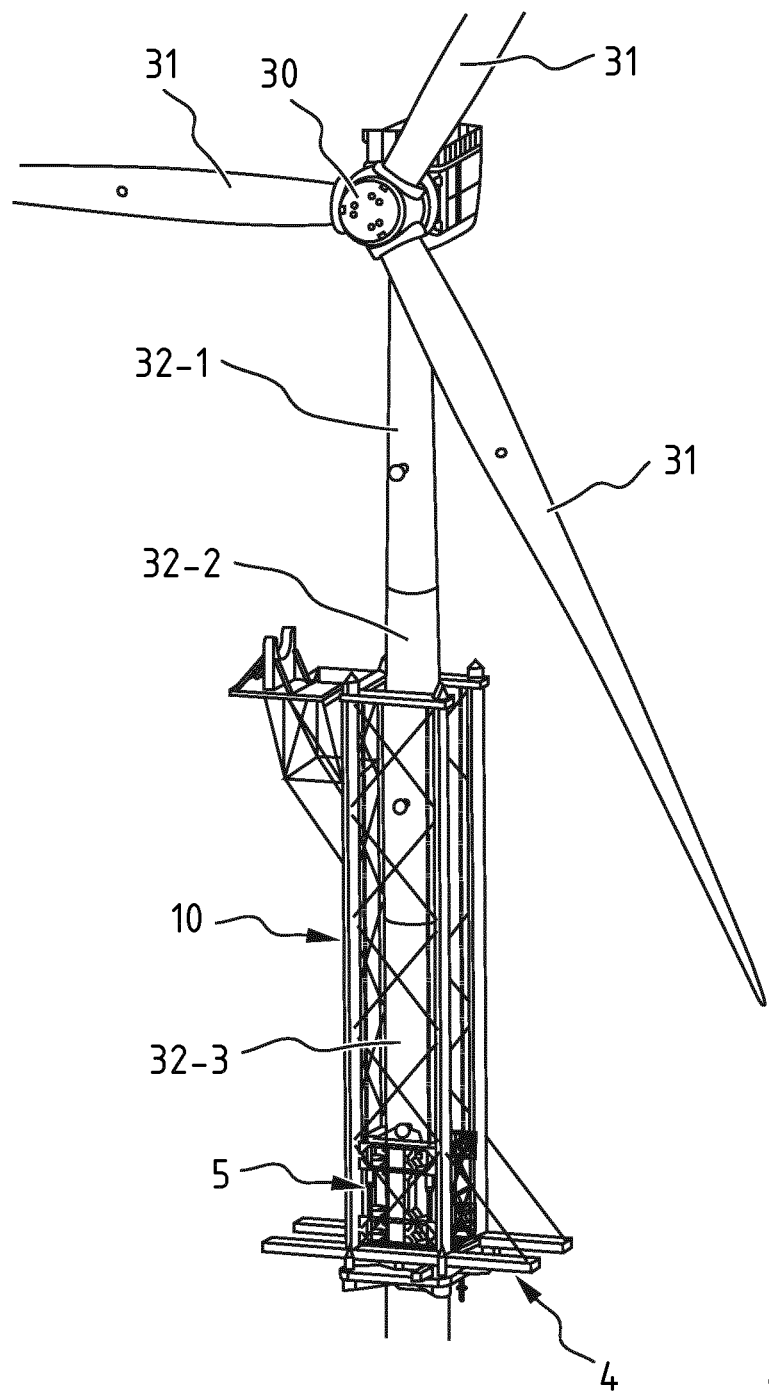

Referring to FIG. 16, the two coupled tower sections (32-1, 32-2) are then moved upward in internal space 11 with the engaging structure 5 by displacing engaging structure 5 upward in vertical direction 103 using strand jacks 54. This creates sufficient space under the relevant coupled tower sections (32-1, 32-2) for receiving another, underlying tower section (32-3) in the internal space 11. In this situation the partially formed wind turbine mast protrudes to substantial extent above the upper surface 10-2 of superstructure 10. The engaging means 58 are important in keeping the partially formed wind turbine mast, which after all is not otherwise supported, upright.

Referring to FIGS. 17-20, the steps described above for the second tower section 32-2 are repeated for a third tower section 32-3. To this end we refer to the description given above of these steps for placing the second tower section 32-2. FIGS. 17, 18, 19 and 20 here describe corresponding method steps as described in FIGS. 8, 10, 12 and 13.

Figure 11:
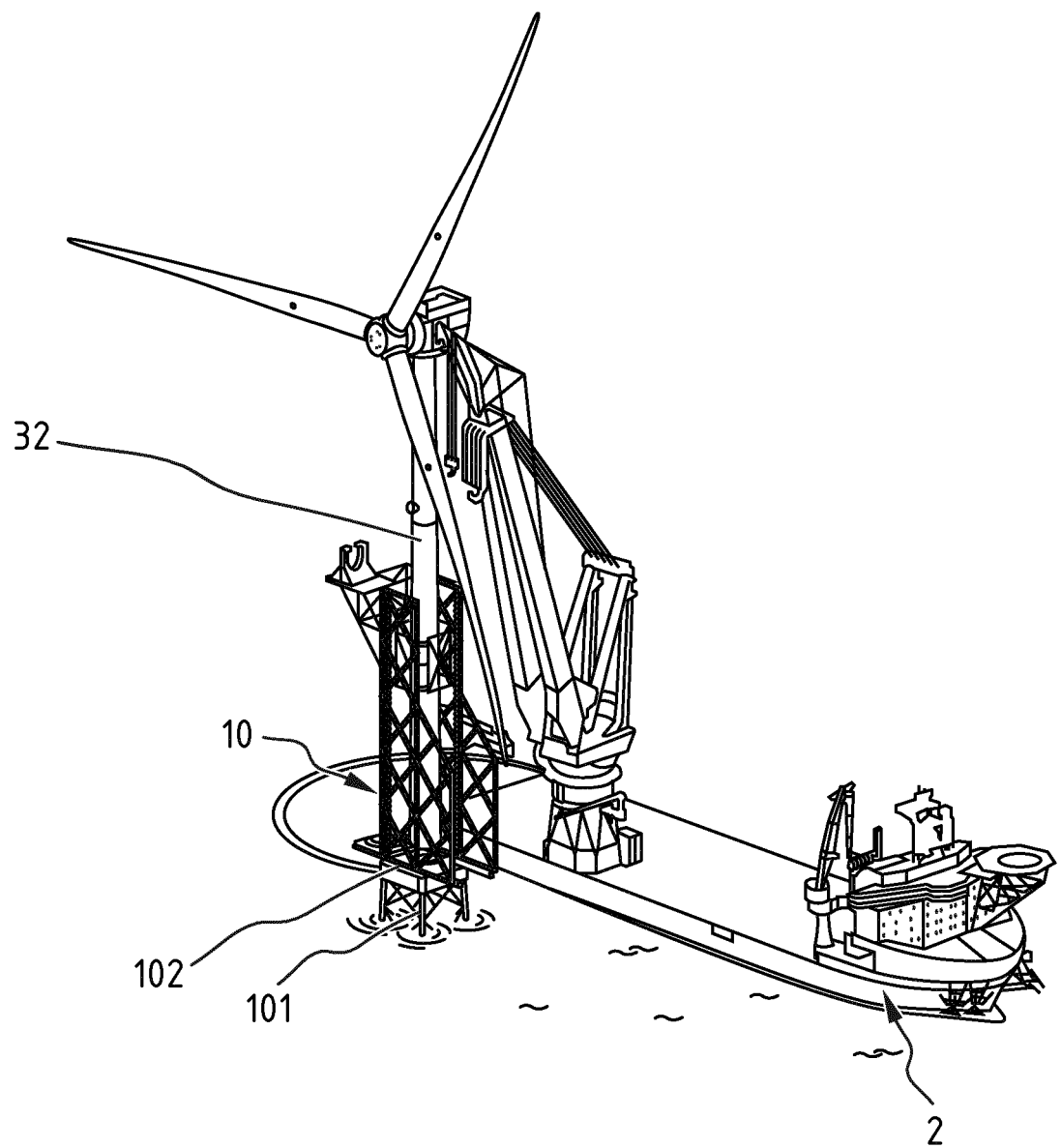

Referring to FIG. 11, the situation resulting after the above described steps is shown, wherein the wind turbine mast is constructed wholly from tower sections (32-1, 32-2, 32-3) placed one on the other. The superstructure 10 is here still situated on foundation 101 and around the constructed wind turbine mast 32. In order to be able to remove superstructure 10 the complete wind turbine mast 32 is lifted slightly with engaging structure 5, and the floor 41 is moved along the support beams 40 of supply structure 4 from the position B in internal space 11 to the position C, lying opposite the position A (see for instance FIG. 12). The wind turbine mast 32 is then lowered again to a position against plate 102, and secured thereto.

Figure 21:
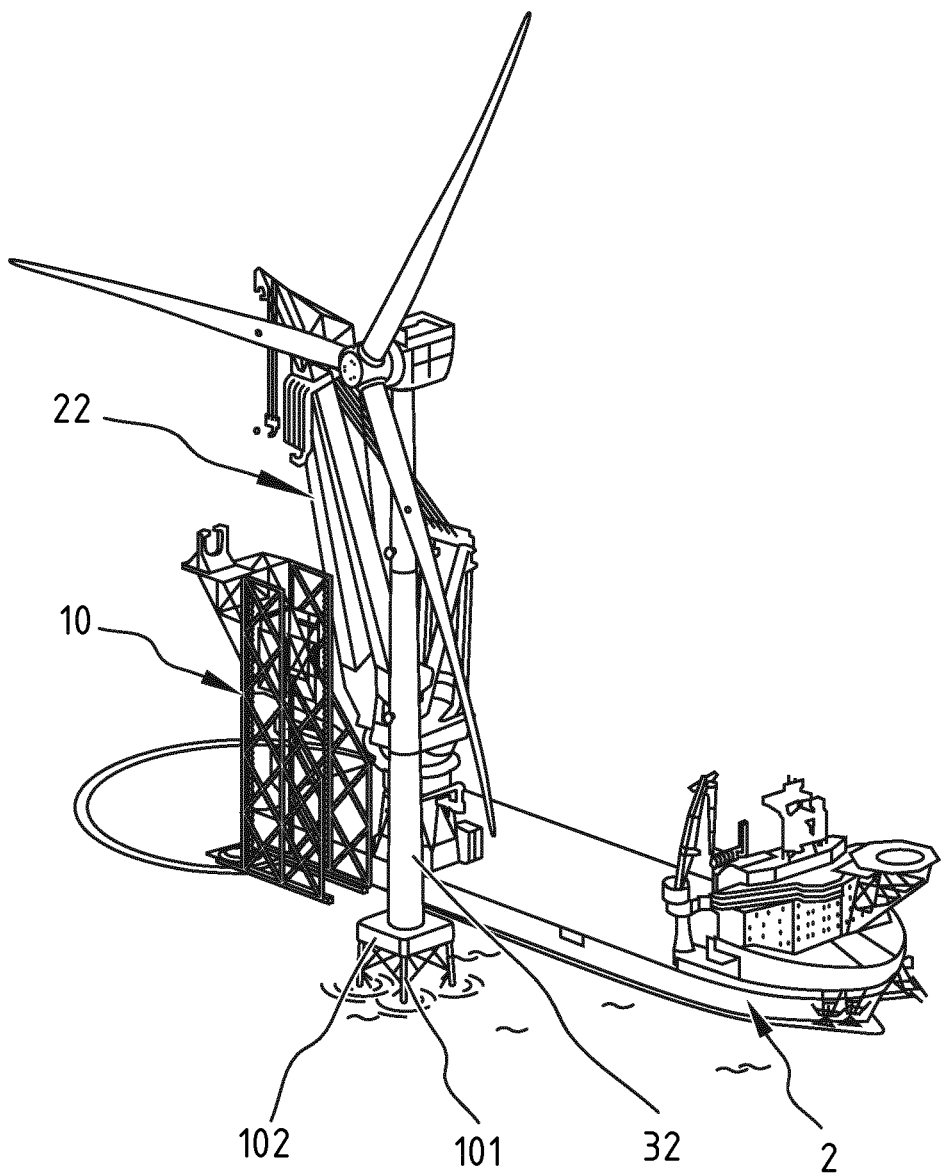
Figure 22:
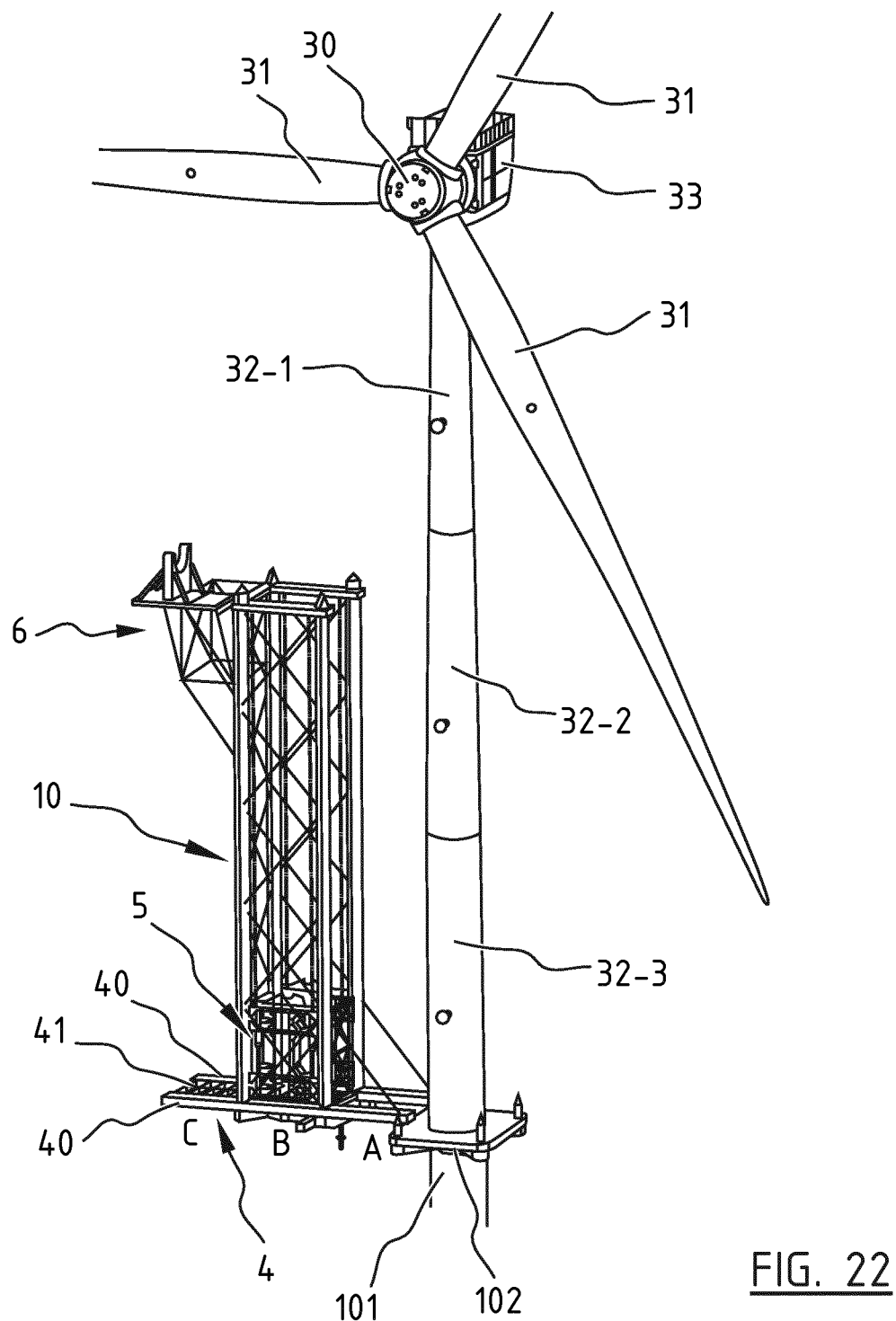

In a final step shown in FIGS. 21 and 22, the superstructure 10 is released from foundation 101 and removed from around wind turbine tower 32 along the open side wall of superstructure 10 with lifting crane 22. Door 51 of engaging structure 5 is here in folded-open state.

It will be apparent that the device 1 can also be applied for arranging components of a wind turbine, for instance when they need to be replaced. A lower tower section 32-3 can thus for instance be replaced by uncoupling the tower sections (32-1, 32-2) from tower section 32-3 and moving them upward with engaging structure 5. The tower section 32-3 to be replaced can then be removed from under the tower sections (32-1, 32-2) by translating the floor 41 from inside to outside from the position B to the position A, and then removing it with lifting crane 22. A new tower section 32-3 can then be supplied with lifting crane 22 and be coupled along the bottom to the tower sections (32-1, 32-2) in the above described manner. Other worn components can also be removed and replaced with new ones in similar manner.

The invention claimed is:
1. A device for offshore arranging of a wind turbine or components thereof on a vertically extending foundation present at sea, comprising:
   an elongate superstructure connected releasably to the foundation and extending between a lower surface and an upper surface thereof in the vertical direction from the foundation, wherein the superstructure comprises an internal space which is accessible to a tower section of the wind turbine and in which the tower section can be received;
   a horizontally displaceable supply structure for a tower section, wherein the supply structure is configured to move a tower section coupled thereto from outside the internal space into the internal space by a horizontal displacement; and an engaging structure, received for vertical displacement in the internal space, for a tower section received in the internal space, wherein the engaging structure is configured to lift an engaged tower section in the internal space by a vertical displacement, whereby sufficient space is created under the relevant tower section for receiving another, underlying tower section in the internal space.

2. The device according to claim 1, wherein the engaging structure is configured to lower an engaged tower section in the internal space to a position against an underlying tower section in order to couple the relevant tower section to the underlying tower section.

3. The device according to claim 1, wherein the engaging structure is configured to lift an engaged tower section in the internal space to a position in which the tower section protrudes above the upper surface of the superstructure.

4. The device according to claim 1, wherein the engaging structure is displaceable between securing positions.

5. The device according to claim 1, wherein the supply structure is arranged at the position of the lower surface of the superstructure.

6. The device according to claim 1, wherein the supply structure protrudes in the horizontal direction on either side of the superstructure.

7. The device according to claim 1, wherein the supply structure comprises a support surface for a floor which is slidable in the horizontal direction between positions inside and outside the internal space and to which a tower section can be coupled, and the support surface preferably protrudes on either side of the superstructure.

8. The device according to claim 1, wherein the superstructure comprises at the position of the upper surface a positioning means for a root of a wind turbine blade, wherein the positioning means is moveable in the horizontal and vertical direction.

9. The device according to claim 1, wherein the internal space of the superstructure is accessible to a tower section by an at least partially open side wall of the superstructure.

10. The device according to claim 1, wherein the superstructure comprises side walls in the form of a lattice.

11. The device according to claim 1, wherein the foundation protrudes partially above water.

12. An assembly for offshore arranging of a wind turbine or components thereof on a vertically extending foundation present at sea, comprising:

a vessel which is provided with the wind turbine components to be arranged, these comprising a hub, one or more blades and/or one or more tower sections for forming a tower of the wind turbine, and further with a lifting means for taking up the wind turbine components; and a device according to claim 1.

13. A method for offshore arranging of a wind turbine or components thereof on a vertically extending foundation present at sea, comprising the steps of:

a) providing an assembly according to claim 12;

b) taking up a tower section with the lifting means and coupling it to the supply structure;

c) moving the tower section coupled to the supply structure from outside the internal space into the internal space by displacing the supply structure and the tower section coupled thereto in horizontal direction;

d) engaging the tower section, which was moved into the internal space, with the engaging structure; and lifting the engaged tower section in the internal space by displacing the engaging structure in vertical direction, whereby sufficient space is created under the relevant tower section for receiving another, underlying tower section in the internal space.

* * * * *